(12) United States Patent
Iwama

(10) Patent No.: US 11,953,818 B2
(45) Date of Patent: Apr. 9, 2024

(54) LIGHT SOURCE APPARATUS AND PROJECTOR

(71) Applicant: SEIKO EPSON CORPORATION, Tokyo (JP)

(72) Inventor: Yuichiro Iwama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/188,508

(22) Filed: Mar. 23, 2023

(65) Prior Publication Data
US 2023/0305372 A1 Sep. 28, 2023

(30) Foreign Application Priority Data

Mar. 23, 2022 (JP) ................. 2022-046484

(51) Int. Cl.
G03B 21/20 (2006.01)
G03B 21/00 (2006.01)
G03B 33/12 (2006.01)

(52) U.S. Cl.
CPC ......... *G03B 21/204* (2013.01); *G03B 21/006* (2013.01); *G03B 33/12* (2013.01)

(58) Field of Classification Search
CPC ..... G03B 21/204; G03B 21/006; G03B 33/12
See application file for complete search history.

(56) References Cited

U.S. PATENT DOCUMENTS

2022/0342137 A1* 10/2022 Yu ................. G02B 6/0068

FOREIGN PATENT DOCUMENTS

WO WO2020/254455 A 12/2020

* cited by examiner

*Primary Examiner* — Donald L Raleigh
(74) *Attorney, Agent, or Firm* — Dority & Manning, P.A.

(57) ABSTRACT

A light source apparatus according to an aspect of the present disclosure includes a light emitter, a light guide member, a support member having a groove, and a position restriction member. The light guide member has a first surface and a second surface located at sides opposite from each other in a first direction, a third surface and a fourth surface located at sides opposite from each other in a second direction, and a fifth surface and a sixth surface located at sides opposite from each other in a third direction. The groove has a support surface facing the fourth surface, a first wall surface facing the fifth surface and separate from the fifth surface, and a second wall surface facing the sixth surface and separate from the sixth surface. The position restriction member includes a first placement section and a second placement section.

14 Claims, 15 Drawing Sheets

LIGHT SOURCE APPARATUS AND PROJECTOR

The present application is based on, and claims priority from JP Application Serial Number 2022-046484, filed Mar. 23, 2022, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light outputted from a light emitter.

WO 2020/254455 discloses a light source apparatus including an excitation light source that outputs excitation light, a rod-shaped phosphor that converts the excitation light into fluorescence, and a heat conduction member that dissipates heat generated in the phosphor. The phosphor is disposed in a groove of the heat conduction member.

In a light source apparatus of this type, it is conceivable that the excitation light outputted from the light emitter spreads beyond the width of the phosphor and enters the gap between each wall surface of the groove and the phosphor. In the light source apparatus disclosed in WO 2020/254455, however, the phosphor is disposed in the vicinity of one wall surface of the groove, so that almost no excitation light enters the phosphor via the side surface thereof in the vicinity of the one wall surface. The efficiency of utilization of the excitation light may therefore be low, so that fluorescence having desired intensity may not be achieved.

SUMMARY

To solve the problem described above, a light source apparatus according to an aspect of the present disclosure includes a light emitter that outputs light, a light guide member that guides the light outputted from the light emitter, a support member that has a groove and supports the light guide member in the groove, and a position restriction member that restricts a position of the light guide member in the groove. The light guide member has a first surface and a second surface located at sides opposite from each other in a first direction that is a longitudinal direction of the light guide member, a third surface and a fourth surface located at sides opposite from each other in a second direction in an imaginary plane perpendicular to the first direction, and a fifth surface and a sixth surface located at sides opposite from each other in a third direction perpendicular to the second direction in the imaginary plane. The light guided through the light guide member exits via the first surface. The light emitter is provided so as to face the third surface. The groove has a support surface facing the fourth surface, a first wall surface facing the fifth surface and separate from the fifth surface, and a second wall surface facing the sixth surface and separate from the sixth surface. The position restriction member includes a first placement section disposed in the groove between the fifth surface and the first wall surface, and a second placement section disposed in the groove between the sixth surface and the second wall surface.

A projector according to another aspect of the present disclosure includes the light source apparatus according to the aspect of the present disclosure, a light modulator that modulates the light outputted from the light source apparatus and containing the second light in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 7.

A projector according to the present embodiment is an example of a projector using a liquid crystal panel as a light modulator.

In the following drawings, components may be drawn at different dimensional scales for clarification of each of the components.

Figure 1:
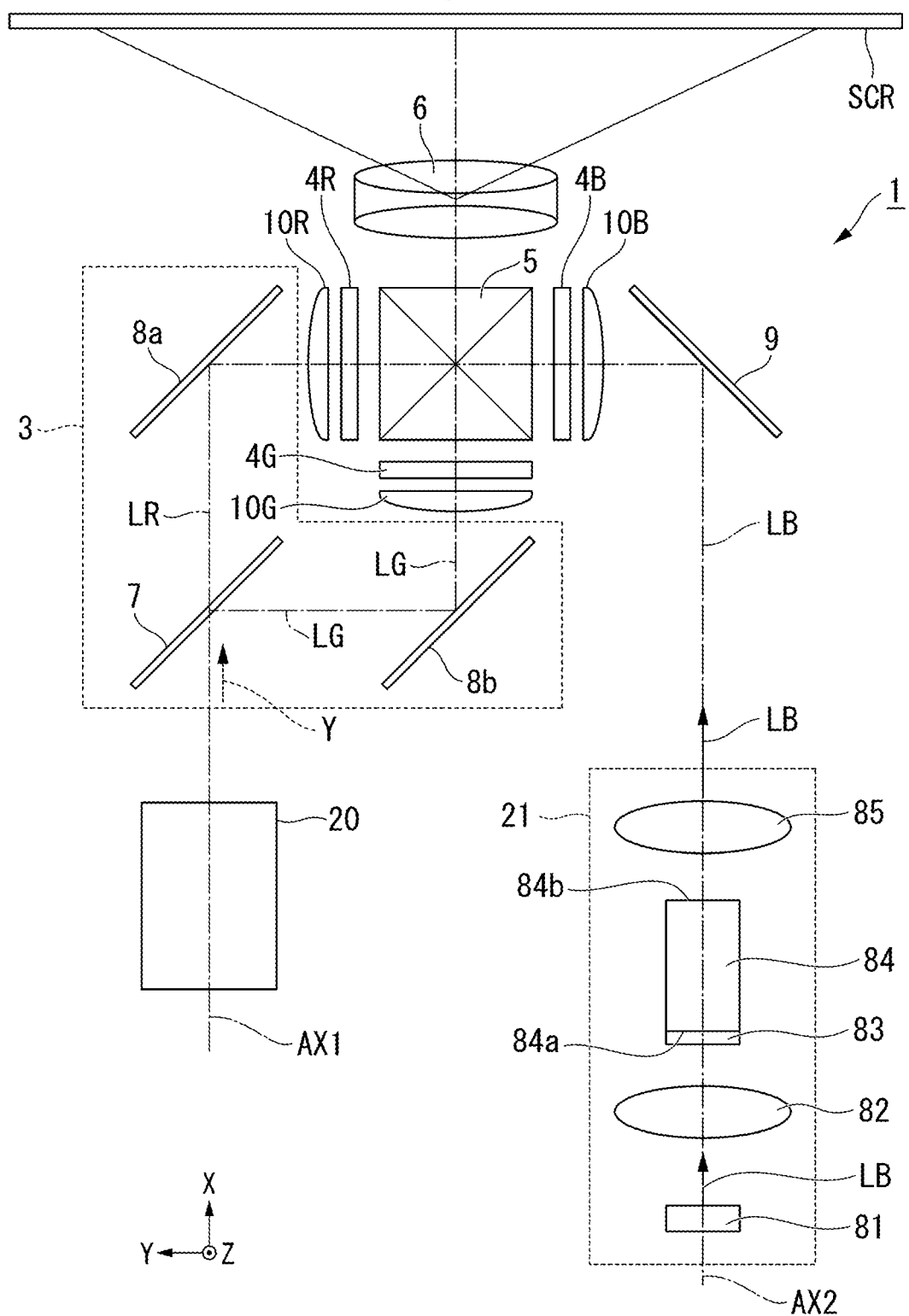
FIG. 1 is a schematic configuration diagram of a projector according to a first embodiment.

FIG. 1 shows a schematic configuration of a projector 1 according to the present embodiment.

The projector 1 according to the present embodiment is a projection-type image display apparatus that displays a color image on a screen (projection receiving surface) SCR, as shown in FIG. 1. The projector 1 includes three light modulators corresponding to three types of color light, red light LR, green light LG, and blue light LB.

The projector 1 includes a first illuminator 20, a second illuminator 21, a color separation system 3, light modulators 4R, 4G, and 4B, a light combiner 5, and a projection optical apparatus 6.

The first illuminator 20 outputs yellow fluorescence Y toward the color separation system 3. The second illuminator 21 outputs the blue light LB toward the light modulator 4B. Detailed configurations of the first illuminator 20 and the second illuminator 21 will be described later.

The following description with reference to the drawings will be made by using an XYZ orthogonal coordinate system as required. The axis Z is an axis extending along the upward-downward direction of the projector 1. The axis X is an axis parallel to an optical axis AX1 of the first illuminator 20 and an optical axis AX2 of the second illuminator 21. The axis Y is an axis perpendicular to the axes X and Z. The optical axis AX1 of the first illuminator 20 is the center axis of the fluorescence Y outputted from the first illuminator 20. The optical axis AX2 of the second illuminator 21 is the center axis of the blue light LB outputted from the second illuminator 21.

The color separation system 3 separates the yellow fluorescence Y outputted from the first illuminator 20 into the red light LR and the green light LG. The color separation system 3 includes a dichroic mirror 7, a first reflection mirror 8a, and a second reflection mirror 8b.

The dichroic mirror 7 separates the fluorescence Y into the red light LR and the green light LG. The dichroic mirror 7 transmits the red light LR and reflects the green light LG. The second reflection mirror 8b is disposed in the optical path of the green light LG. The second reflection mirror 8b reflects the green light LG reflected off the dichroic mirror 7 toward the light modulator 4G. The first reflection mirror 8a is disposed in the optical path of the red light LR. The first reflection mirror 8a reflects the red light LR having passed through the dichroic mirror 7 toward the light modulator 4R.

On the other hand, the blue light LB outputted from the second illuminator 21 is reflected off a reflection mirror 9 toward the light modulator 4B.

The configuration of the second illuminator 21 will be described below.

The second illuminator 21 includes a light source section 81, a focusing lens 82, a diffuser plate 83, a rod lens 84, and a relay lens 85. The light source section 81 is formed of at least one semiconductor laser. The light source section 81 outputs the blue light LB formed of laser light. The light source section 81 is not necessarily formed of a semiconductor laser and may be formed of an LED that outputs blue light.

The focusing lens 82 is formed of a convex lens. The focusing lens 82 causes the blue light LB outputted from the light source section 81 to be incident on the diffuser plate 83 with the blue light LB substantially focused thereon. The diffuser plate 83 diffuses the blue light LB having exited out of the focusing lens 82 into blue light LB diffused by a predetermined degree to generate blue light LB having a substantially uniform light orientation distribution similar to that of the fluorescence Y outputted from the first illuminator 20. The diffuser plate 83 is, for example, a ground glass plate made of optical glass.

The blue light LB diffused by the diffuser plate 83 enters the rod lens 84. The rod lens 84 has a quadrangular columnar shape extending along the optical axis AX2 of the second illuminator 21. The rod lens 84 has a light incident end surface 84a provided at one end of the rod lens 84 and a light exiting end surface 84b provided at the other end thereof. The diffuser plate 83 is fixed to the light incident end surface 84a of the rod lens 84 via an optical adhesive (not shown). It is desirable that the refractive index of the diffuser plate 83 match as much as possible with the refractive index of the rod lens 84.

The blue light LB propagates through the interior of the rod lens 84 while being totally reflected therein and exits via the light exiting end surface 84b with the illuminance distribution uniformity of the blue light LB increased. The blue light LB having exited out of the rod lens 84 enters the relay lens 85. The relay lens 85 causes the blue light LB having the illuminance distribution uniformity increased by the rod lens 84 to be incident on the reflection mirror 9.

The light exiting end surface 84b of the rod lens 84 has a rectangular shape substantially similar to the shape of an image formation region of the light modulator 4B. The blue light LB having exited out of the rod lens 84 is thus efficiently incident on the image formation region of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed at the light incident and exiting sides of each of the liquid crystal panels. The polarizers each transmit only linearly polarized light polarized in a specific direction.

A field lens 10R is disposed at the light incident side of the light modulator 4R. A field lens 10G is disposed at the light incident side of the light modulator 4G. A field lens 10B is disposed at the light incident side of the light modulator 4B. The field lens 10R parallelizes the chief ray of the red light LR to be incident on the light modulator 4R. The field lens 10G parallelizes the chief ray of the green light LG to be incident on the light modulator 4G. The field lens 10B parallelizes the chief ray of the blue light LB to be incident on the light modulator 4B.

The light combiner 5 receives the image light outputted from the light modulator 4R, the image light outputted from the light modulator 4G, and the image light outputted from the light modulator 4B, combines the image light corresponding to the red light LR, the image light corresponding to the green light LG, and the image light corresponding to the blue light LB with one another, and outputs the combined image light toward the projection optical apparatus 6. The light combiner 5 is, for example, a cross dichroic prism.

The projection optical apparatus 6 is formed of a plurality of projection lenses. The projection optical apparatus 6 enlarges the combined image light from the light combiner 5 and projects the enlarged image light toward the screen SCR. An image is thus displayed on the screen SCR.

The configuration of the first illuminator 20 will be described below.

Figure 2:
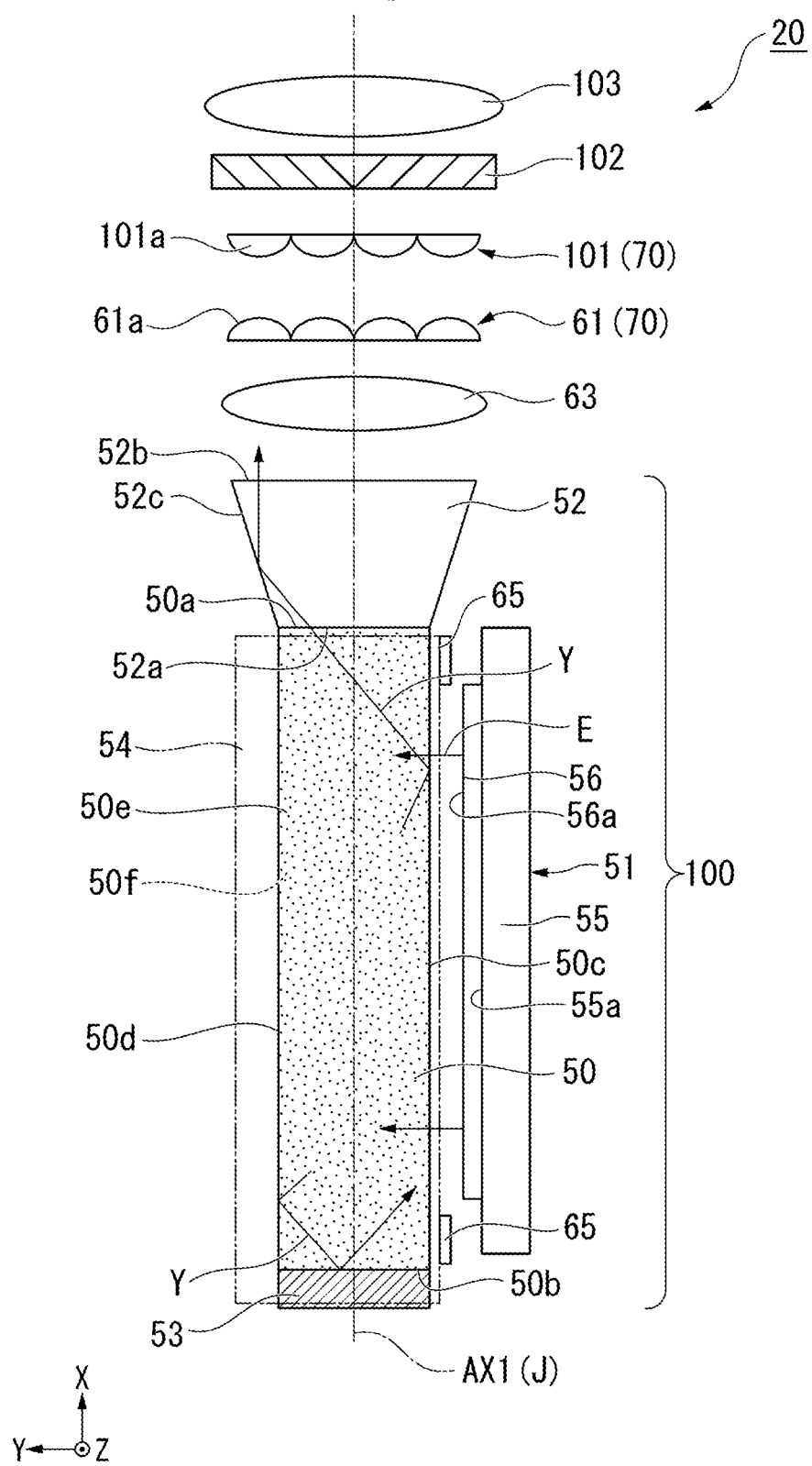
FIG. 2 is a schematic configuration diagram of a first illuminator in the first embodiment.

FIG. 2 is a schematic configuration diagram of the first illuminator 20.

The first illuminator 20 includes a light source apparatus 100, an optical integration system 70, a polarization converter 102, and a superimposing system 103, as shown in FIG. 2.

The light source apparatus 100 includes a wavelength conversion member 50, a light source section 51, an angle conversion member 52, a mirror 53, a support member 54, and position restriction members 65. The light source section 51 includes a substrate 55 and a light emitter 56.

The wavelength conversion member 50 in the present embodiment corresponds to the light guide member in the claims.

The wavelength conversion member 50 has a quadrangular columnar shape extending in the axis-X direction and has six surfaces. The sides of the wavelength conversion member 50 that extend in the axis-X direction are longer than the sides of the wavelength conversion member 50 that extend in the axis-Y direction and the sides thereof that extend in the axis-Z direction. The axis-X direction therefore corresponds to the longitudinal direction of the wavelength conversion member 50. The length of the sides extending in the axis-Y direction is equal to the length of the sides extending in the axis-Z direction. That is, the wavelength conversion member 50 has a square cross-sectional shape taken along a plane perpendicular to the axis-X direction. The wavelength conversion member 50 may instead have an oblong cross-sectional shape taken along a plane perpendicular to the axis-X direction.

The wavelength conversion member 50 has a first surface 50a, a second surface 50b, a third surface 50c, a fourth surface 50d, a fifth surface 50e, and a sixth surface 50f. The first surface 50a and the second surface 50b intersect with the longitudinal direction (axis-X direction) of the wavelength conversion member 50 and are located at the sides opposite from each other. The third surface 50c and the fourth surface 50d intersect with the first surface 50a and the second surface 50b, and are located at the sides opposite from each other in the axis-Y direction in an imaginary plane perpendicular to the longitudinal direction. The fifth surface 50e and the sixth surface 50f intersect with the third surface 50c and the fourth surface 50d, and are located at the sides opposite from each other in the axis-Z direction in an imaginary plane perpendicular to the longitudinal direction. In the following description, the third surface 50c, the fourth surface 50d, the fifth surface 50e, and the sixth surface 50f may be referred to as side surfaces. The axis-X direction in the present embodiment corresponds to the first direction in the claims. The axis-Y direction in the present embodiment corresponds to the second direction in the claims. The axis-Z direction in the present embodiment corresponds to the third direction in the claims.

The wavelength conversion member 50 at least contains a phosphor and converts excitation light E having a first wavelength band into the fluorescence Y having a second wavelength band different from the first wavelength band. The excitation light E enters the wavelength conversion member 50 via the third surface 50c. The fluorescence Y is guided through the interior of the wavelength conversion member 50, and then exits via the first surface 50a. The excitation light E in the present embodiment corresponds to the first light in the claims. The fluorescence Y in the present embodiment corresponds to the second light in the claims.

The wavelength conversion member 50 contains a ceramic phosphor formed of a polycrystal phosphor that converts the excitation light E in terms of wavelength into the fluorescence Y. The second wavelength band of the fluorescence Y is, for example, a yellow wavelength band ranging from 490 to 750 nm. That is, the fluorescence Y is yellow fluorescence containing a red light component and a green light component.

The wavelength conversion member 50 may contain a single crystal phosphor in place of a polycrystal phosphor. The wavelength conversion member 50 may instead be made of fluorescent glass. Still instead, the wavelength conversion member 50 may be formed of a binder which is made of glass or resin and in which a large number of phosphor particles are dispersed. The wavelength conversion member 50 made of any of the materials described above converts the excitation light E into the fluorescence Y having the second wavelength band.

Specifically, the material of the wavelength conversion member 50 contains, for example, an yttrium-aluminum-garnet-based (YAG-based) phosphor. Consider YAG:Ce, which contains cerium (Ce) as an activator, by way of example, and the wavelength conversion member 50 is made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The light source section 51 includes the light emitter 56 having a light emitting surface 56a, via which the excitation light E having the first wavelength band is outputted. The light emitter 56 is formed, for example, of a light emitting diode (LED). The light emitting surface 56a of the light emitter 56 faces the third surface 50c of the wavelength conversion member 50, and the light emitter 56 outputs the excitation light E via the light emitting surface 56a toward the third surface 50c. The first wavelength band is, for example, a blue-violet wavelength band ranging from 400 to 480 nm and has a peak wavelength of, for example, 445 nm. The light source section 51 is thus provided so as to face one of the four side surfaces, which extend along the longitudinal direction of the wavelength conversion member 50.

The substrate 55 supports the light emitter 56. The light emitter 56 is provided at one surface 55a of the substrate 55. In the present embodiment, the light source section 51 is formed of the light emitter 56 and the substrate 55 and may further include a light guide plate, a diffuser plate, a lens, and other optical members. In the present embodiment, one light emitter 56 is used, but the number of light emitters 56 is not limited to a specific number.

The support member 54 is provided so as to surround the circumference of the wavelength conversion member 50. The support member 54 supports the wavelength conversion member 50, and diffuses heat generated by the wavelength conversion member 50 to dissipate the heat out of the wavelength conversion member 50. It is therefore desirable that the support member 54 be made of a material having predetermined strength and high thermal conductivity. It is desirable to use, for example, a metal such aluminum and stainless steel, in particular, an aluminum alloy such as a 6061 aluminum alloy as the material of the support member 54. A specific configuration of the support member 54 will be described later.

The position restriction members 65 restrict the position of the wavelength conversion member 50 with respect to the support member 54. That is, the wavelength conversion member 50 is restricted in terms of position with respect to the support member 54 by the position restriction members 65. A specific configuration of the position restriction members 65 will be described later.

The mirror 53 is provided at the second surface 50b of the wavelength conversion member 50. The mirror 53 reflects the fluorescence Y having been guided through the interior of the wavelength conversion member 50 and having reached the second surface 50b. The mirror 53 is formed of a metal film or a dielectric multilayer film formed at the second surface 50b of the wavelength conversion member 50.

In the first illuminator 20, when the excitation light E outputted from the light source section 51 enters the wavelength conversion member 50, the phosphor contained in the wavelength conversion member 50 is excited, and the fluorescence Y is emitted from random light emission points. The fluorescence Y travels omnidirectionally from the random light emission points, and the fluorescence Y traveling toward the four side surfaces 50c, 50d, 50e, and 50f are totally reflected off the side surfaces 50c, 50d, 50e, and 50f and travels toward the first surface 50a or the second surface 50b in the process of repeated total reflection at a plurality of locations. The fluorescence Y traveling toward the first surface 50a enters the angle conversion member 52. The fluorescence Y traveling toward the second surface 50b is reflected off the mirror 53 and travels toward the first surface 50a.

Out of the excitation light E having entered the wavelength conversion member 50, part of the excitation light E, the part not having been used to excite the phosphor, is reflected off members around the wavelength conversion member 50, including the light emitter 56 of the light source section 51, or the mirror 53 provided at the second surface 50b. The part of the excitation light E is therefore confined in the wavelength conversion member 50 and reused.

The angle conversion member 52 is provided at the light exiting side of the first surface 50a of the wavelength conversion member 50. The angle conversion member 52 is formed, for example, of a tapered rod. The angle conversion member 52 has a light incident surface 52a, on which the fluorescence Y having exited out of the wavelength conversion member 50 is incident, a light exiting surface 52b, via which the fluorescence Y exits, and a side surface 52c, which reflects the incident fluorescence Y toward the light exiting surface 52b.

The angle conversion member 52 has a truncated quadrangular pyramidal shape, and has a cross-sectional area that is perpendicular to an optical axis J and widens along the light traveling direction. The area of the light exiting surface 52b is therefore greater than the area of the light incident surface 52a. The optical axis J of the angle conversion member 52 is the axis passing through the centers of the light exiting surface 52b and the light incident surface 52a and parallel to the axis X. The optical axis J of the angle conversion member 52 coincides with the optical axis AX1 of the first illuminator 20.

The fluorescence Y having entered the angle conversion member 52 changes its orientation while traveling through the interior of the angle conversion member 52 in such a way that the direction of the fluorescence Y approaches the direction parallel to the optical axis J whenever the fluorescence Y is totally reflected off the side surface 52c. The angle conversion member 52 thus converts the exiting angle distribution of the fluorescence Y having exited via the first surface 50a of the wavelength conversion member 50. Specifically, the angle conversion member 52 makes the largest exiting angle of the fluorescence Y at the light exiting surface 52b smaller than the largest incident angle of the fluorescence Y at the light incident surface 52a.

In general, since the etendue of light specified by the product of the area of a light exiting region and the solid angle of the light (largest exiting angle) is preserved, the etendue of the fluorescence Y before the fluorescence Y passes through the angle conversion member 52 is preserved after the passage. The angle conversion member 52 has the configuration in which the area of the light exiting surface 52b is greater than the area of the light incident surface 52a, as described above. The angle conversion member 52 can therefore make the largest exiting angle of the fluorescence Y at the light exiting surface 52b smaller than the largest incident angle of the fluorescence Y incident on the light incident surface 52a from the viewpoint of the etendue preservation.

The angle conversion member 52 is fixed to the wavelength conversion member 50 via an optical adhesive (not shown) so that the light incident surface 52a faces the first surface 50a of the wavelength conversion member 50. That is, the angle conversion member 52 and the wavelength conversion member 50 are in contact with each other via the optical adhesive, and there is no air gap (air layer) between the angle conversion member 52 and the wavelength conversion member 50. If there is an air gap between the angle conversion member 52 and the wavelength conversion member 50, out of the fluorescence Y having reached the light incident surface 52a of the angle conversion member 52, the fluorescence Y incident on the light incident surface 52a at angles of incidence greater than the critical angle is totally reflected off the light incident surface 52a and cannot enter the angle conversion member 52. In contrast, when there is no air gap between the angle conversion member 52 and the wavelength conversion member 50, as in the present embodiment, the amount of fluorescence Y that cannot enter the angle conversion member 52 can be reduced. It is desirable from the viewpoint described above that the refractive index of the angle conversion member 52 match as much as possible with the refractive index of the wavelength conversion member 50.

The angle conversion member 52 may be a compound parabolic concentrator (CPC) in place of a tapered rod. The same effect is provided both when a CPC is used as the angle conversion member 52 and when a tapered rod is used as the angle conversion member 52. The light source apparatus 100 may not necessarily include the angle conversion member 52.

A parallelizing system 63, which is formed, for example, of a collimator lens, is provided between the light source apparatus 100 and the optical integration system 70. The parallelizing system 63 further reduces the angular distribution of the fluorescence Y outputted from the angle conversion member 52 and causes the resultant fluorescence Y having a high degree of parallelism to enter the optical integration system 70. The parallelizing system 63 may not be provided when the fluorescence Y outputted from the angle conversion member 52 has a sufficiently high degree of parallelism.

The optical integration system 70 includes a first lens array 61 and a second lens array 101. The optical integration system 70, along with the superimposing system 103, functions as an illumination homogenizing system that homogenizes the intensity distribution of the fluorescence Y outputted from the light source apparatus 100 at each of the light modulators 4R and 4G, which are illumination receiving regions. The fluorescence Y having exited out of the parallelizing system 63 enters the first lens array 61. The first lens array 61, along with the second lens array 101 provided at a position downstream from the light source apparatus 100, forms the optical integration system 70.

The first lens array 61 includes a plurality of first lenslets 61a. The plurality of first lenslets 61a are arranged in a matrix in a plane parallel to the plane YZ perpendicular to the optical axis AX1 of the first illuminator 20. The plurality of first lenslets 61a divide the fluorescence Y having exited out of the angle conversion member 52 into a plurality of sub-luminous fluxes. The first lenslets 61a each have a rectangular cross-sectional shape substantially similar to the shape of the image formation region of each of the light modulators 4R and 4G. The sub-luminous fluxes having exited out of the first lens array 61 are thus each efficiently incident on the image formation region of each of the light modulators 4R and 4G.

The fluorescence Y having exited out of the first lens array 61 travels toward the second lens array 101. The second lens array 101 is disposed so as to face the first lens array 61. The second lens array 101 includes a plurality of second lenslets 101a corresponding to the plurality of first lenslets 61a of the first lens array 61. The second lens array 101 along with the superimposing system 103 brings images of the plurality of first lenslets 61a of the first lens array 61 into focus in the vicinity of the image formation region of each of the light modulators 4R and 4G. The plurality of second lenslets 101a are arranged in a matrix in a plane parallel to the plane YZ perpendicular to the optical axis AX1 of the first illuminator 20.

In the present embodiment, the first lenslets 61a of the first lens array 61 and the second lenslets 101a of the second lens array 101 have the same size, and may instead have sizes different from each other. In the present embodiment, the first lenslets 61a of the first lens array 61 and the second lenslets 101a of the second lens array 101 are so disposed that the optical axes thereof coincide with each other, and may instead be so disposed that the optical axes thereof deviate from each other.

The polarization converter 102 converts the polarization directions of the fluorescence Y having exited out of the second lens array 101. Specifically, the polarization converter 102 converts the sub-luminous fluxes of the fluorescence Y into which the first lens array 61 divides the fluorescence Y and which exit out of the second lens array 101 into linearly polarized sub-luminous fluxes.

The polarization converter 102 includes polarization separation layers (not shown) that directly transmit one of the linearly polarized components contained in the fluorescence Y outputted from the light source apparatus 100 and reflect another one of the linearly polarized components in a direction perpendicular to the optical axis AX1, reflection layers (not shown) that reflect the other linearly polarized component reflected off the polarization separation layers in the direction parallel to the optical axis AX1, and retardation films (not shown) that convert the other linearly polarized component reflected off the reflection layers into the one linearly polarized component.

The features of the light source apparatus 100 according to the present embodiment will be described below.

Figure 3:
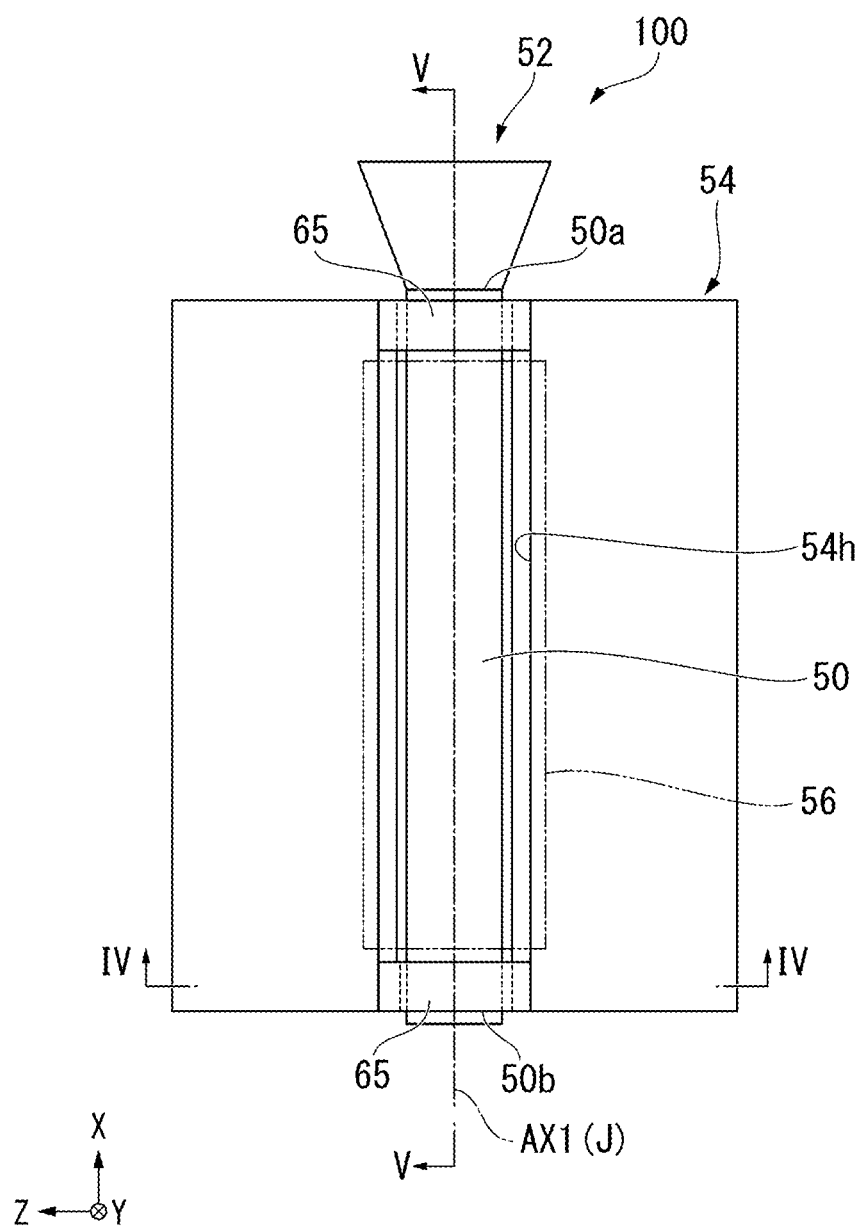
FIG. 3 is a plan view of the light source apparatus according to the first embodiment viewed in an axis-Y direction.
Figure 4:
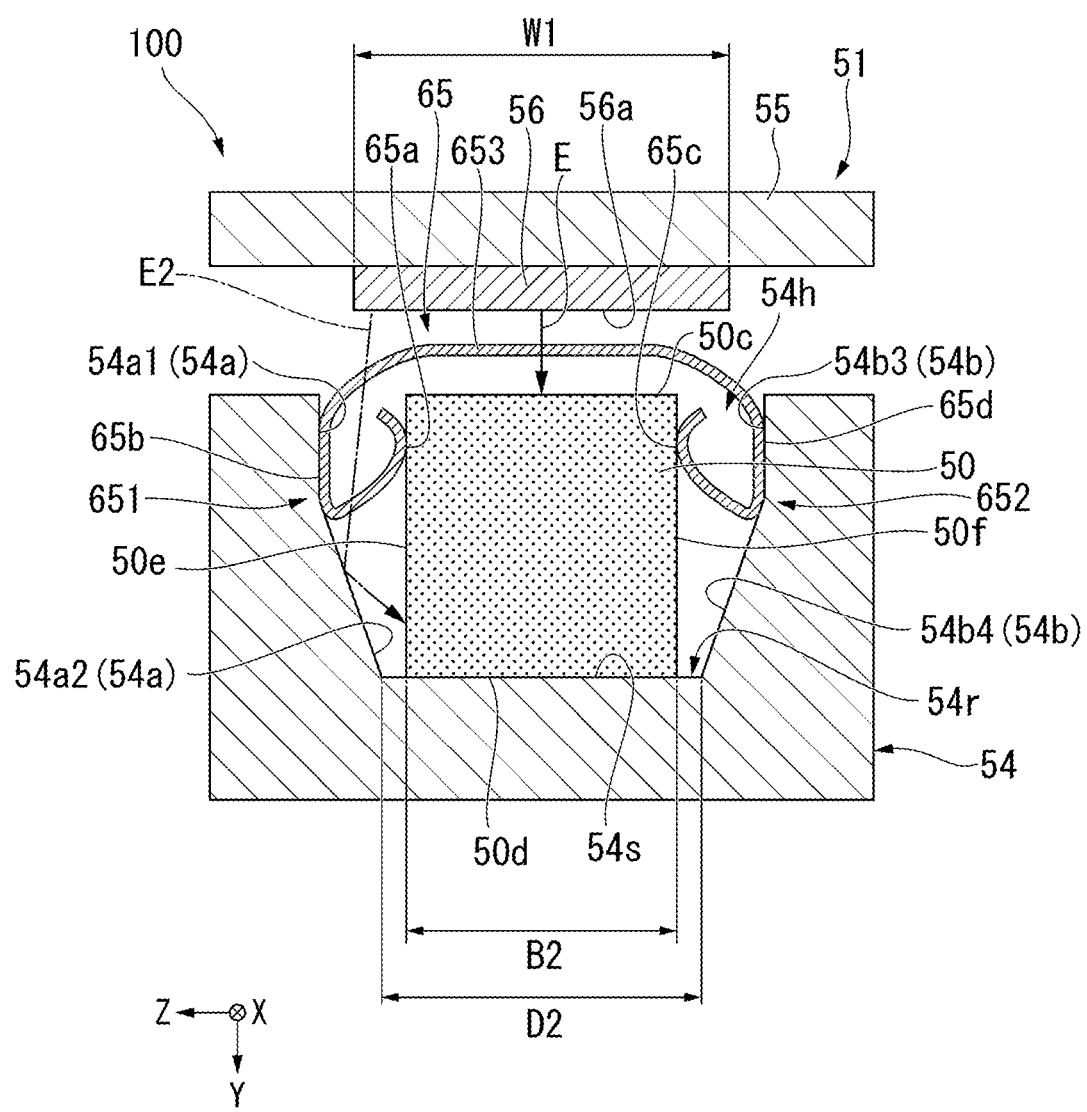
FIG. 4 is a cross-sectional view of the light source apparatus taken along the line IV-IV in FIG. 3.
Figure 5:
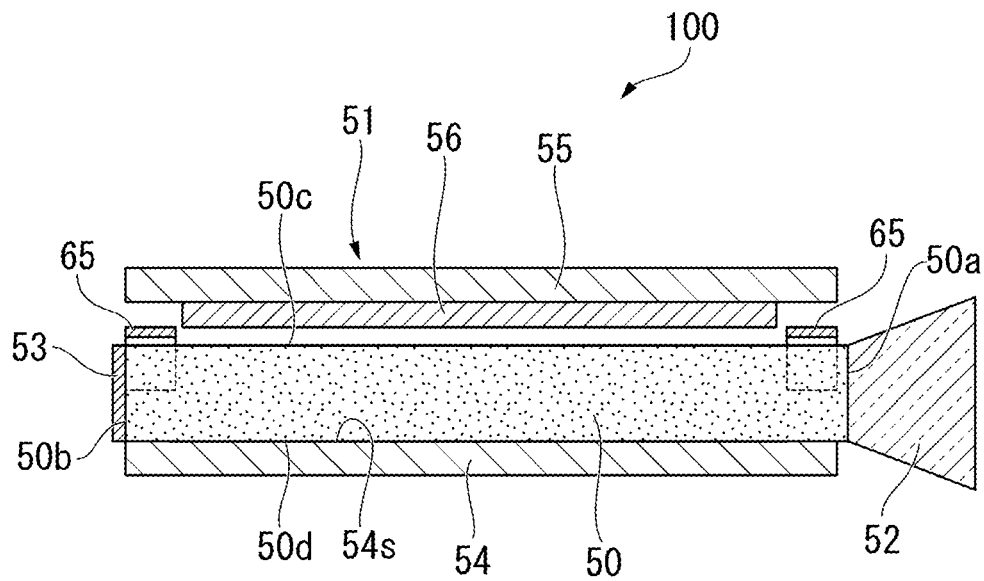
FIG. 5 is a cross-sectional view of the light source apparatus taken along the line V-V in FIG. 3.
Figure 5:
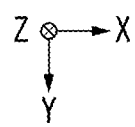
Figure 6:
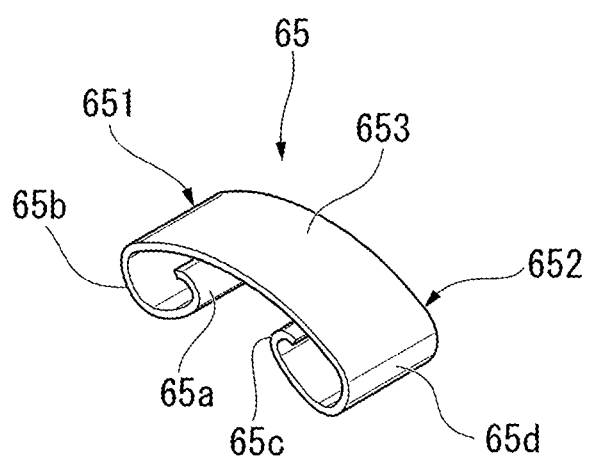
FIG. 6 is a perspective view of a position restriction member.
Figure 7:
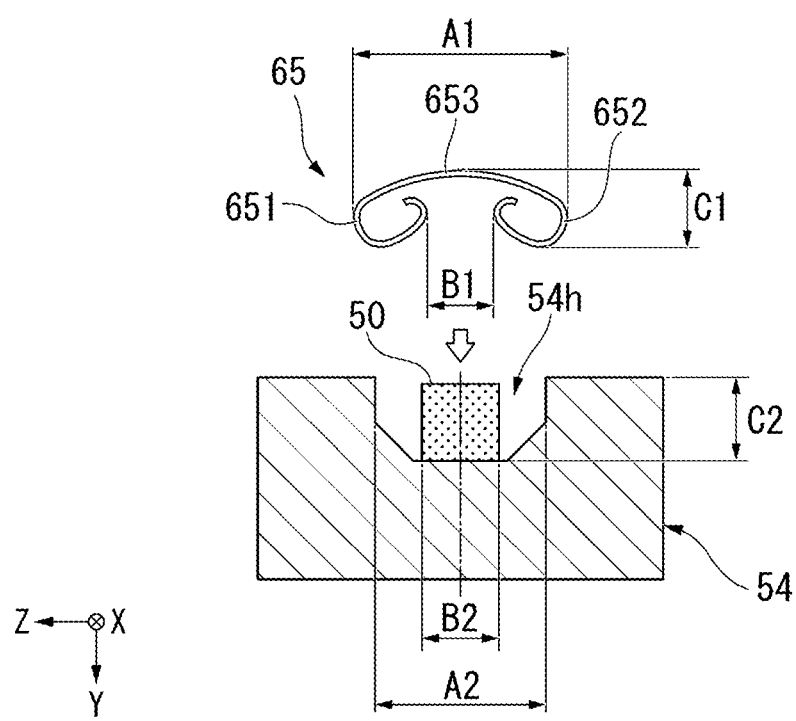
FIG. 7 shows the state before the position restriction member is attached.

FIG. 3 is a plan view of the light source apparatus 100 viewed in the axis-Y direction. FIG. 4 is a cross-sectional view of the light source apparatus 100 taken along the line IV-IV in FIG. 3. FIG. 5 is a cross-sectional view of the light source apparatus 100 taken along the line V-V in FIG. 3. FIG. 6 is a perspective view of one of the position restriction members 65. FIG. 7 shows the state before the position restriction members 65 are attached to the support member 54.

The support member 54 extends in the longitudinal direction (axis-X direction) of the wavelength conversion member 50, and has a groove 54h, which houses the wavelength conversion member 50, as shown in FIG. 3. The support member 54, which has the groove 54h, has a U-letter-shaped cross section perpendicular to the axis-X direction, as shown in FIG. 4. The groove 54h has a support surface 54s, a first wall surface 54a, and a second wall surface 54b.

The support surface 54s corresponds to the bottom surface of the groove 54h, and faces the fourth surface 50d of the wavelength conversion member 50. In the present embodiment, the support surface 54s extends in parallel to the plane XZ. The first wall surface 54a corresponds to one side surface of the groove 54h, faces the fifth surface 50e of the wavelength conversion member 50, and is separate from the fifth surface 50e. The second wall surface 54b corresponds to the other side surface of the groove 54h, faces the sixth surface 50f of the wavelength conversion member 50, and is separate from the sixth surface 50f. That is, a gap is provided between the first wall surface 54a and the fifth surface 50e of the wavelength conversion member 50. A gap is provided between the second wall surface 54b and the sixth surface 50f of the wavelength conversion member 50.

The first wall surface 54a includes a first section 54a1, which is located at the side close to the third surface 50c, and a second portion 54a2, which is located at the side close to the support surface 54s. The first section 54a1 extends in the direction perpendicular to the support surface 54s, that is, in parallel to the plane XY. The second section 54a2 inclines so as to approach the fifth surface 50e as extending from the side close to the first section 54a1 toward the support surface 54s. In other words, the distance between the fifth surface 50e and the second section 54a2 close to the support surface 54s is smaller than the distance between the fifth surface 50e and the second section 54a2 close to the first section 54a1.

The second wall surface 54b includes a third section 54b3, which is located at the side close to the third surface 50c, and a fourth portion 54b4, which is located at the side close to the support surface 54s. The third section 54b3 extends in the direction perpendicular to the support surface 54s, that is, in parallel to the plane XY. The fourth section 54b4 inclines so as to approach the sixth surface 50f as extending from the side close to the third section 54b3 toward the support surface 54s. In other words, the distance between the sixth surface 50f and the fourth section 54b4 close to the support surface 54s is smaller than the distance between the sixth surface 50f and the fourth section 54b4 close to the third section 54b3.

The first wall surface 54a and the second wall surface 54b are each formed of a surface made, for example, of aluminum, stainless steel, or any other metal of which the support member 54 is made. More specifically, the first wall surface 54a and the second wall surface 54b are each formed of a processed surface that is the metal surface described above on which mirror-finishing has been performed. The first wall surface 54a and the second wall surface 54b therefore each have light reflectivity and reflect the excitation light E incident thereon. The first wall surface 54a and the second wall surface 54b may each be formed of a metal film formed on the surface made of aluminum, stainless steel, or any other metal and made of metal different therefrom, or a dielectric multilayer film.

A dimension W1, along the axis-Z direction, of the light emitting surface 56a of the light emitter 56 is greater than a width B2, along the axis-Z direction, of the wavelength conversion member 50. The opposite ends of the light emitting surface 56a of the light emitter 56 therefore extend off the third surface 50c of the wavelength conversion member 50 in the axis-Z direction. Specifically, the opposite ends of the light emitting surface 56a of the light emitter 56 extend off to positions where one of the opposite ends overlaps with the gap between the fifth surface 50e and the first wall surface 54a and the other opposite end overlaps with the gap between the sixth surface 50f and the second wall surface 54b. In other words, when the light emitting surface 56a is viewed from the side facing the support surface 54s along the axis-Y direction, a portion of the light emitting surface 56a coincides with the third surface 50c, and the other portion of the light emitting surface 56a overlaps with the gap between the fifth surface 50e and the first wall surface 54a and the gap between the sixth surface 50f and the second wall surface 54b.

A dimension D2, along the axis-Z direction, of the support surface 54s of the support member 54 is greater than the width B2, along the axis-Z direction, of the wavelength conversion member 50. The opposite ends of the support surface 54s therefore extend off the fourth surface 50d of the wavelength conversion member 50 in the axis-Z direction. In other words, when the support surface 54s is viewed from the side facing the light emitting surface 56a along the axis-Y direction, a portion of the support surface 54s coincides with the fourth surface 50d, and the other portion of the support surface 54s is exposed to the space outside of the fourth surface 50d. The support surface 54s thus has an exposed section 54r exposed to the space outside the wavelength conversion member 50.

The position restriction members 65 restrict the position of the wavelength conversion member 50 in the groove 54h, as shown in FIGS. 3 to 6. The position restriction members 65 each include a first placement section 651, a second placement section 652, and a linkage section 653. The position restriction members 65 are each so shaped that the portion facing the first placement section 651 and the portion facing the second placement section 652 are symmetrical with respect to the center of the linkage section 653. The first placement section 651 and the second placement section 652 curl at the opposite sides of the plate-shaped linkage section 653.

The first placement section 651 is disposed in the groove 54h between the fifth surface 50e of the wavelength conversion member 50 and the first wall surface 54a of the support member 54. The second placement section 652 is disposed in the groove 54h between the sixth surface 50f of the wavelength conversion member 50 and the second wall surface 54b of the support member 54. The linkage section 653 is provided so as to face the third surface 50c of the wavelength conversion member 50, and links the first placement section 651 and the second placement section 652 to each other. The position restriction members 65 each use the first placement section 651 and the second placement section 652 to restrict movement of the wavelength conversion member 50 in the axis-Z direction by a distance greater than or equal to a predetermined value.

The first placement section 651 has a first restriction surface 65a, which faces the fifth surface 50e, and a second restriction surface 65b, which faces the first wall surface 54a. The second placement section 652 has a third restriction surface 65c, which faces the sixth surface 50f, and a fourth restriction surface 65d, which faces the second wall surface 54b. In the present embodiment, the first restriction surface 65a and the fifth surface 50e are in contact with each other, and the second restriction surface 65b and the first wall surface 54a are in contact with each other. The third restriction surface 65c and the sixth surface 50f are in contact with each other, and the fourth restriction surface 65d and the second wall surface 54b are in contact with each other.

The position restriction members 65 are made of an elastically deformable material. The position restriction members 65 are each formed, for example, of a plate spring made of a metallic material, for example, SUS 304 or any other stainless steel material. The position restriction members 65 may instead be made of resin, rubber, or any other elastically deformable material. It is, however, desirable that the position restriction members 65 be made of a material that excels in light and heat resistance, such as a metallic material. The first placement section 651, the second placement section 652, and the linkage section 653 are configured as an integrated member in the present embodiment, and may instead have a configuration in which separate members are linked to each other. In this case, it is desirable that at least the first placement section 651 and the second placement section 652 be made of an elastically deformable material.

In the state before the position restriction members 65 are attached to the support member 54, that is, in an initial state in which the position restriction members 65 are not elastically deformed, let A1 be the width (length in axis-Z direction) of each of the position restriction members 65, B1 be the spacing (length in axis-Z direction) between the first placement section 651 and the second placement section 652, and C1 be the height of each of the position restriction members 65 (length in axis-Y direction from lower ends of first placement section 651 and second placement section 652 to upper end of linkage section 653), as shown in FIG. 7. Let A2 be the width (length in axis-Z direction) of the groove 54h of the support member 54, B2 be the width (length in axis-Z direction) of the wavelength conversion member 50, and C2 be the depth of the groove 54h (length in axis-Y direction).

Under the definitions described above, the dimensions satisfy a relationship A1 A2, B1 B2, and C1<C2. That is, the width A1 of each of the position restriction members 65 in the initial state is equal to or greater than the width A2 of the groove 54h. The spacing B1 between the first placement section 651 and the second placement section 652 is equal to or smaller than the width B2 of the wavelength conversion member 50. The height C1 of each of the position restriction members 65 is smaller than the depth C2 of the groove 54h.

In the present embodiment, the dimensions described above are, for example, A1=2.2 mm, B1=0.9 mm, C1=0.5 mm, A2=2.0 mm, B2=1.0 mm, and C2=1.1 mm. Therefore, in the present embodiment, in the initial state, the width A1 of each of the position restriction members 65 is greater than the width A2 of the groove 54h, and the spacing B1 between the first placement section 651 and the second placement section 652 is smaller than the width B2 of the wavelength conversion member 50. The thus dimensioned position restriction members 65 are elastically deformed and pushed into the groove 54h from above the wavelength conversion member 50. The position restriction members 65 are thus attached to the support member 54.

The elastically deformed first placement section 651 is thus disposed in the groove 54h between the fifth surface 50e and the first wall surface 54a, as shown in FIG. 4. Similarly, the elastically deformed second placement section 652 is disposed in the groove 54h between the sixth surface 50f and the second wall surface 54b. At this point, the elastic force of each of the position restriction members 65 causes the first restriction surface 65a of the first placement section 651 to press the fifth surface 50e of the wavelength conversion member 50 and the second restriction surface 65b to press the first wall surface 54a of the support member 54. Similarly, the third restriction surface 65c of the second placement section 652 presses the sixth surface 50f of the wavelength conversion member 50, and the fourth restriction surface 65d presses the second wall surface 54b of the support member 54.

When viewed in the direction perpendicular to the third surface 50c of the wavelength conversion member 50 (axis-Y direction), the position restriction members 65 are disposed at positions where the position restriction members 65 do not overlap with the light emitter 56, as shown in FIGS. 3 and 5. In the present embodiment, the position restriction members 65 are disposed at positions where the position restriction members 65 do not overlap with the light emitter 56, and located at longitudinally opposite ends of the wavelength conversion member 50, that is, at the end, of the wavelength conversion member 50, that is close to the first surface 50a and the end, of the wavelength conversion member 50, that is close to the second surface 50b. The position restriction members 65 are not necessarily disposed at the ends of the wavelength conversion member 50. For example, in a case where a plurality of light emitters are disposed at intervals, the position restriction members 65 may be disposed at positions where the position restriction members 65 do not overlap with the light emitters but overlap with the regions between the adjacent light emitters.

Effects of First Embodiment

The light source apparatus 100 according to the present embodiment includes the light emitter 56, which outputs the excitation light E, the wavelength conversion member 50, which converts the excitation light E outputted from the light emitter 56 into the fluorescence Y and guides the fluorescence Y, the support member 54, which has the groove 54h and supports the wavelength conversion member 50 in the groove 54h, and the position restriction members 65, which restrict the position of the wavelength conversion member 50 in the groove 54h. The wavelength conversion member 50 has the first surface 50a and the second surface 50b, which are located at sides opposite from each other in the axis-X direction, which is the longitudinal direction of the wavelength conversion member 50, the third surface 50c and the fourth surface 50d, which are located at sides opposite from each other in the axis-Y direction, and the fifth surface 50e and the sixth side surface 50f, which are located at sides opposite from each other in the axis-Z direction. The fluorescence Y, which is guided through the wavelength conversion member 50, exits via the first surface 50a. The light emitter 56 is provided so as to face the third surface 50c. The groove 54h has the support surface 54s, which faces the fourth surface 50d, the first wall surface 54a, which faces the fifth surface 50e but is separate therefrom, and the second wall surface 54b, which faces the sixth surface 50f but is separate therefrom. The position restriction members 65 each include the first placement section 651, which is disposed in the groove 54h between the fifth surface 50e and the first wall surface 54a, and the second placement section 652, which is disposed in the groove 54h between the sixth surface 50f and the second wall surface 54b, and the first placement section 651 and the second placement section 652 restrict movement of the wavelength conversion member 50 in the axis-Z direction by a distance greater than or equal to a predetermined value.

According to the configuration described above, the position restriction members 65 maintains in a stable manner the state in which the fifth surface 50e of the wavelength conversion member 50 is separate from the first wall surface 54a of the groove 54h, and the sixth surface 50f of the wavelength conversion member 50 is separate from the second wall surface 54b of the groove 54h. The excitation light E outputted from the light emitter 56 therefore enters the wavelength conversion member 50 not only via the third surface 50c thereof but also via the fifth surface 50e and the sixth surface 50f thereof. As a result, the efficiency of utilization of the excitation light E can be increased as compared with the related-art light source apparatus, in which the wavelength conversion member is disposed in the vicinity of one wall surface of the groove, whereby fluorescence Y having desired intensity can be generated.

Figure 18:
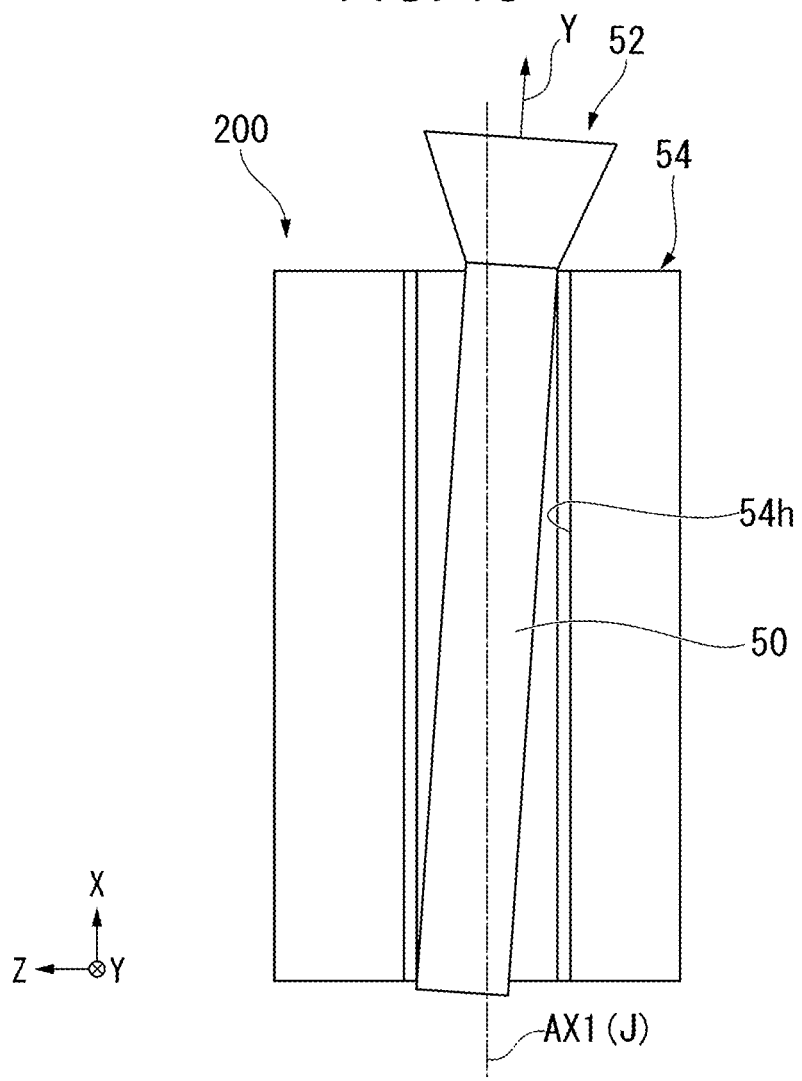
FIG. 18 shows a problem with the light source apparatus according to Comparative Example.
Figure 19:
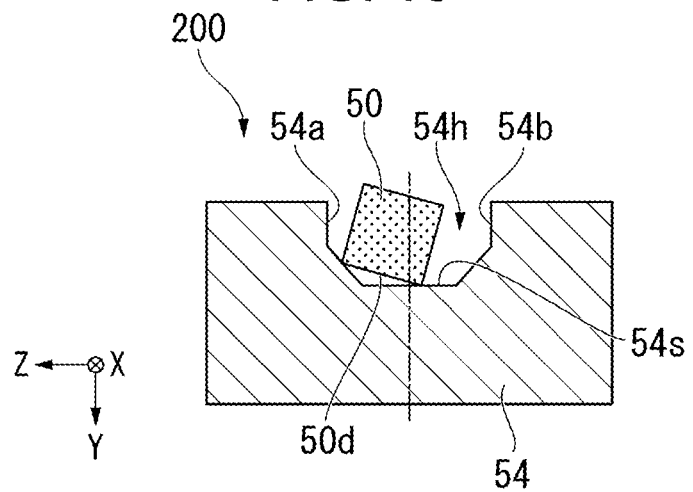
FIG. 19 shows another problem with the light source apparatus according to Comparative Example.

Even when the side surfaces of the wavelength conversion member 50 are allowed to be separate from the wall surfaces of the groove 54h, but when the position restriction members 65 in the present embodiment are not provided, the wavelength conversion member 50 may incline with respect to the optical axis J in the groove 54h of the support member 54, as shown in FIG. 18. In this case, the following problems, for example, occur: The traveling direction of the fluorescence Y outputted from the light source apparatus 200 deviates from an intended direction, and therefore enters an optical system downstream from the light source apparatus 200 at angles larger than expected, or in some cases does not enter the optical system downstream from the light source apparatus 200. In other cases, it is conceivable that a corner of the wavelength conversion member 50 is stranded on the first wall surface 54a or the second wall surface 54b of the groove 54h of the support member 54, as shown in FIG. 19. In this case, the fourth surface 50d of the wavelength conversion member 50 is separate from the support surface 54s of the support member 54, heat of the wavelength conversion member 50 is not sufficiently transferred to the support member 54, so that the wavelength conversion efficiency may decrease.

To solve the problems described above, the light source apparatus 100 according to the present embodiment, in which the position restriction members 65 restrict the position of the wavelength conversion member 50 in the axis-Z direction in the groove 54h, maintains the state in which the wavelength conversion member 50 is disposed substantially at the center of the groove 54h in the axis-Z direction. The traveling direction of the fluorescence Y outputted from the light source apparatus 100 therefore coincides with the optical axis J, whereby the fluorescence Y having a desired angle of incidence and a desired amount of light is allowed to enter an optical system downstream from the light source apparatus 100. Furthermore, the situation in which a corner of the wavelength conversion member 50 is stranded on the first wall surface 54a or the second wall surface 54b of the groove 54h is suppressed. The heat of the wavelength conversion member 50 is therefore sufficiently transferred to the support member 54, whereby desired wavelength conversion efficiency can be maintained.

In the light source apparatus 100 according to the present embodiment, the first placement section 651 has the first restriction surface 65a, which faces the fifth surface 50e, and the second restriction surface 65b, which faces the first wall surface 54a, and the second placement section 652 has the third restriction surface 65c, which faces the sixth surface 50f, and the fourth restriction surface 65d, which faces the second wall surface 54b.

According to the configuration described above, in which the wavelength conversion member 50 and the position restriction members 65 face each other via surfaces thereof, and so do the support member 54 and the position restriction members 65, the position restriction members 65 can restrict the position of the wavelength conversion member 50 in the axis-Z direction in a stable manner.

In the light source apparatus 100 according to the present embodiment, the first restriction surface 65a and the fifth surface 50e are in contact with each other, the second restriction surface 65b and the first wall surface 54a are in contact with each other, the third restriction surface 65c and the sixth surface 50f are contact with each other, and the fourth restriction surface 65d and the second wall surface 54b are in contact with each other.

According to the configuration described above, movement of the wavelength conversion member 50 in the axis-Z direction can be more reliably restricted. Furthermore, the heat of the wavelength conversion member 50 can be transferred to the support member 54 via the position restriction members 65.

In the light source apparatus 100 according to the present embodiment, the first placement section 651 and the second placement section 652 are each made of an elastically deformable material. The elastically deformed first placement section 651 is disposed in the groove 54h between the fifth surface 50e and the first wall surface 54a. The elastically deformed second placement section 652 is disposed in the groove 54h between the sixth surface 50f and the second wall surface 54b.

According to the configuration described above, in the state in which the position restriction members 65 are attached to the support member 54, the elastic force produced by the first placement section 651 causes the first restriction surface 65a and the second restriction surface 65b of the first placement section 651 to press the fifth surface 50e and the first wall surface 54a, respectively, and the elastic force produced by the second placement section 652 causes the third restriction surface 65c and the fourth restriction surface 65d of the second placement section 652 to press the sixth surface 50f and the second wall surface 54b, respectively. The fifth surface 50e and the sixth surface 50f of the wavelength conversion member 50 are therefore pressed substantially equally from opposite sides, whereby the wavelength conversion member 50 can be disposed in a stable manner substantially at the center of the groove 54h.

In the light source apparatus 100 according to the present embodiment, the position restriction members 65 each further include the linkage section 653, which is provided so as to face the third surface 50c and links the first placement section 651 and the second placement section 652 to each other.

According to the configuration described above, the position restriction members 65 can each be handled as an integrated member, which facilitates assembly of the light source apparatus 100.

In the light source apparatus 100 according to the present embodiment, when viewed in the direction perpendicular to the third surface 50c, the position restriction members 65 are disposed at positions where the position restriction members 65 do not overlap with the light emitter 56.

According to the configuration described above, when the excitation light E outputted from the light emitter 56 enters the wavelength conversion member 50, the position restriction members 65 do not block the excitation light E. A decrease in the efficiency of utilization of the excitation light E can thus be suppressed.

In the light source 100 according to the present embodiment, the first wall surface 54a has the first section 54a1, which is relatively far away from the support surface 54s and extends in the direction perpendicular to the support surface 54s, and the second section 54a2, which is relatively close to the support surface 54s and inclines with respect to the support surface 54s. The second wall surface 54b has the third section 54b3, which is relatively far away from the support surface 54s and extends in the direction perpendicular to the support surface 54s, and the fourth section 54b4, which is relatively close to the support surface 54s and inclines with respect to the support surface 54s. The first section 54a1, the second section 54a2, the third section 54b3, and the fourth section 54b4 reflect at least part of the excitation light E.

According to the configuration described above, excitation light E2, which is part of the excitation light E outputted via the light emitting surface 56a of the light emitter 56, passes through the gap between the fifth surface 50e of the wavelength conversion member 50 and the first section 54a1, and is then incident on the second section 54a2, which inclines with respect to the support surface 54s, as shown in FIG. 4. In this process, the excitation light E2 is reflected off the second section 54a2 and incident on the fifth surface 50e of the wavelength conversion member 50. The excitation light E2 passing through the gap between the fifth surface 50e of the wavelength conversion member 50 and the first wall surface 54a is thus likely to be incident on the fifth surface 50e, whereby the amount of excitation light E that is reflected off the support surface 54s and returns back toward the light source section 51 can be reduced. Furthermore, part of the excitation light E is reflected off the first section 54a1, which extends in the direction perpendicular to the support surface 54s, and is incident on the fifth surface 50e of the wavelength conversion member 50. The light source apparatus 100 according to the present embodiment can therefore use the excitation light E in a highly efficient manner and readily generate fluorescence Y having desired intensity.

The projector 1 according to the present embodiment, which includes the light source apparatus 100 according to the present embodiment, excels in the light utilization efficiency.

First Variation

Variations of the present embodiment will be described below.

Figure 8:
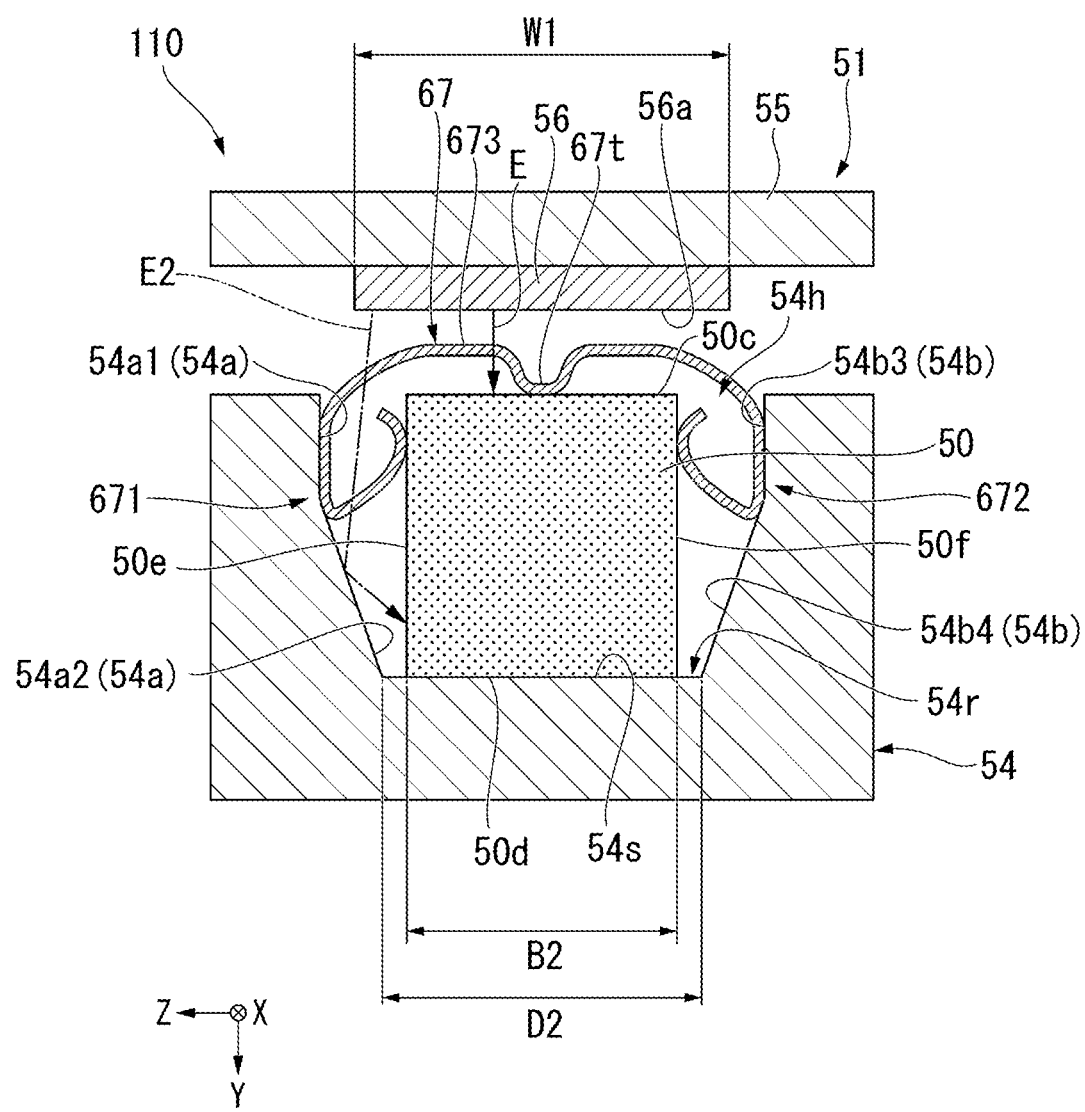
FIG. 8 is a cross-sectional view of the light source apparatus according to a first variation.

FIG. 8 is a cross-sectional view of a light source apparatus 110 according to a first variation. In the following drawings, components common to those of the light source apparatus 100 according to the embodiment described above have the same reference characters and will not be described.

The light source apparatus 110 according to the first variation includes the wavelength conversion member 50, the support member 54, position restriction members 67, and the light source section 51, as shown in FIG. 8. The position restriction members 67 each include a first placement section 671, a second placement section 672, and a linkage section 673. The linkage section 673 has a protrusion 67t, which protrudes toward the third surface 50c of the wavelength conversion member 50 and is in contact with the third surface 50c. The protrusion 67t has a configuration in which the plate spring that constitutes the position restriction member 67 has a curved central portion having a U-letter-like shape.

The light source apparatus 110 according to the present variation, which also increases the efficiency of utilization of the excitation light E and ensures desired wavelength conversion efficiency, provides the same effects as those provided by the embodiment described above, for example, fluorescence Y having desired intensity can be generated, and desired fluorescence is allowed to enter an optical system downstream from the light source apparatus 110.

In the light source apparatus 110 according to the present variation, in which the linkage section 673 protrudes toward the third surface 50c of the wavelength conversion member 50 and has the protrusion 67t in contact with the third surface 50c, the protrusion 67t presses the third surface 50c toward the support surface 54s. As a result, the fourth surface 50d of the wavelength conversion member 50 and the support surface 54s of the support member 54 are in close contact with each other, so that the heat of the wavelength conversion member 50 is more reliably transferred to the support member 54, whereby desired wavelength conversion efficiency can be maintained.

Second Variation

Figure 9:
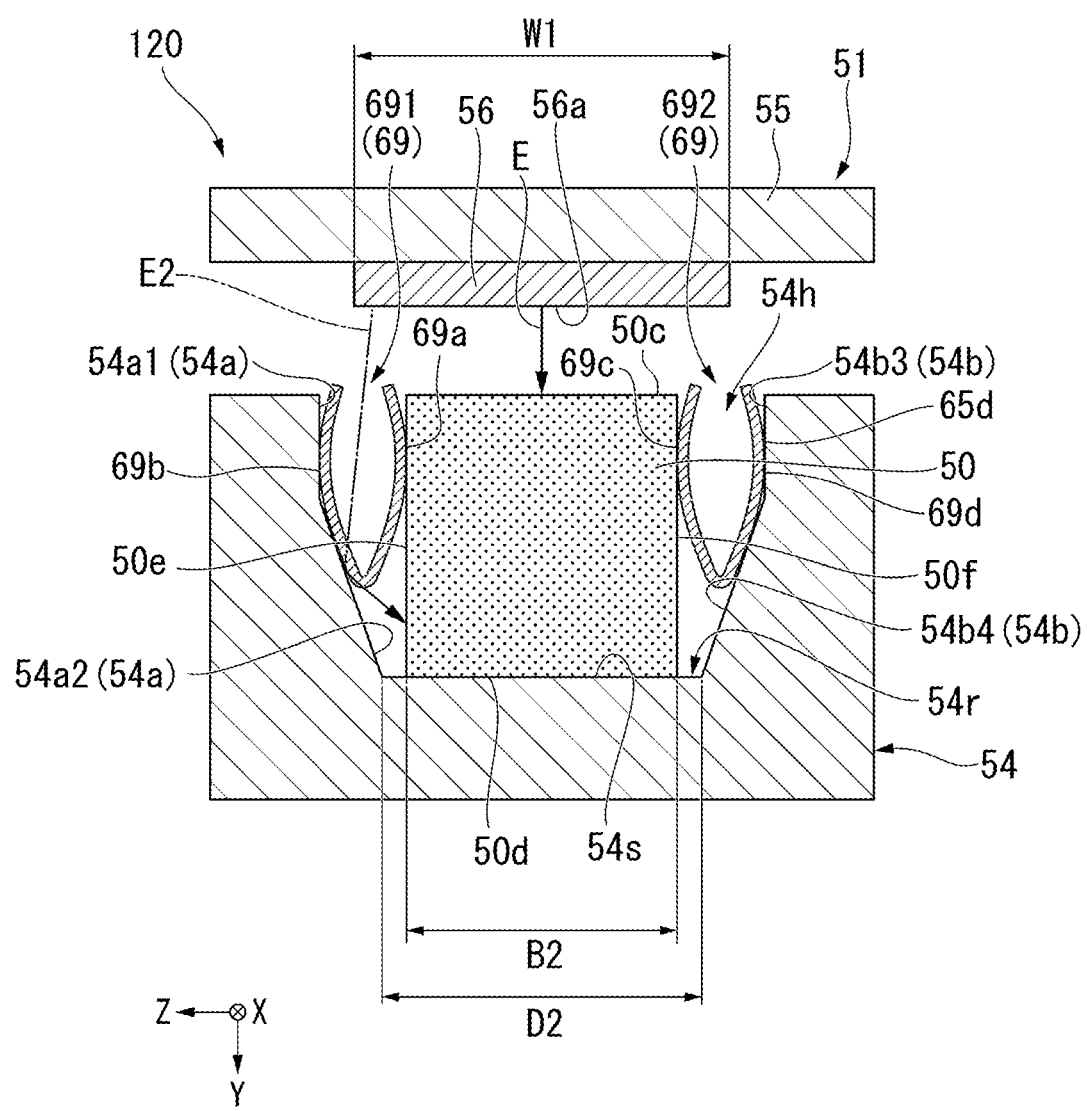
FIG. 9 is a cross-sectional view of the light source apparatus according to a second variation.

FIG. 9 is a cross-sectional view of a light source apparatus 120 according to a second variation.

The light source apparatus 120 according to the second variation includes the wavelength conversion member 50, the support member 54, position restriction members 69, and the light source section 51, as shown in FIG. 9. The position restriction members 69 each include a first placement section 691 and a second placement section 692. That is, the position restriction members 69 in the present variation each include no linkage section. The first placement section 691 and the second placement section 692 are formed of separate members. The first placement section 691 and the second placement section 692 have the same shape and the same dimensions. The first placement section 691 has a first restriction surface 69a, which is in contact with the fifth surface 50e, and a second restriction surface 69b, which is in contact with the first wall surface 54a. The second placement section 692 has a third restriction surface 69c, which is in contact with the sixth surface 50f, and a fourth restriction surface 69d, which is in contact with the second wall surface 54b.

The light source apparatus 120 according to the present variation, which also increases the efficiency of utilization of the excitation light E and ensures desired wavelength conversion efficiency, provides the same effects as those provided by the embodiment described above, for example, fluorescence Y having desired intensity can be generated, and desired fluorescence Y is allowed to enter an optical system downstream from the light source apparatus 120.

In the light source apparatus 120 according to the present variation, the first placement section 691 and the second placement section 692 are formed of separate members and each include no linkage section, so that the third surface 50c of the wavelength conversion member 50 directly faces the light emitting surface 56a of the light emitter 56. There is therefore no risk that the excitation light E outputted from the light emitter 56 is blocked by the position restriction members 69. Therefore, according to the present configuration, it is not necessary to employ an arrangement in which the position restriction members 69 do not overlap with the light emitter 56, whereby the position restriction members 69 can be disposed with increased flexibility.

Second Embodiment

A second embodiment of the present disclosure will be described below with reference to FIGS. 10 to 12.

The basic configurations of a projector and a light source apparatus according to the second embodiment are the same as those in the first embodiment, but the configuration of the position restriction members differs from that in the first embodiment. The basic configurations of the projector and the light source apparatus will therefore not be described.

Figure 10:
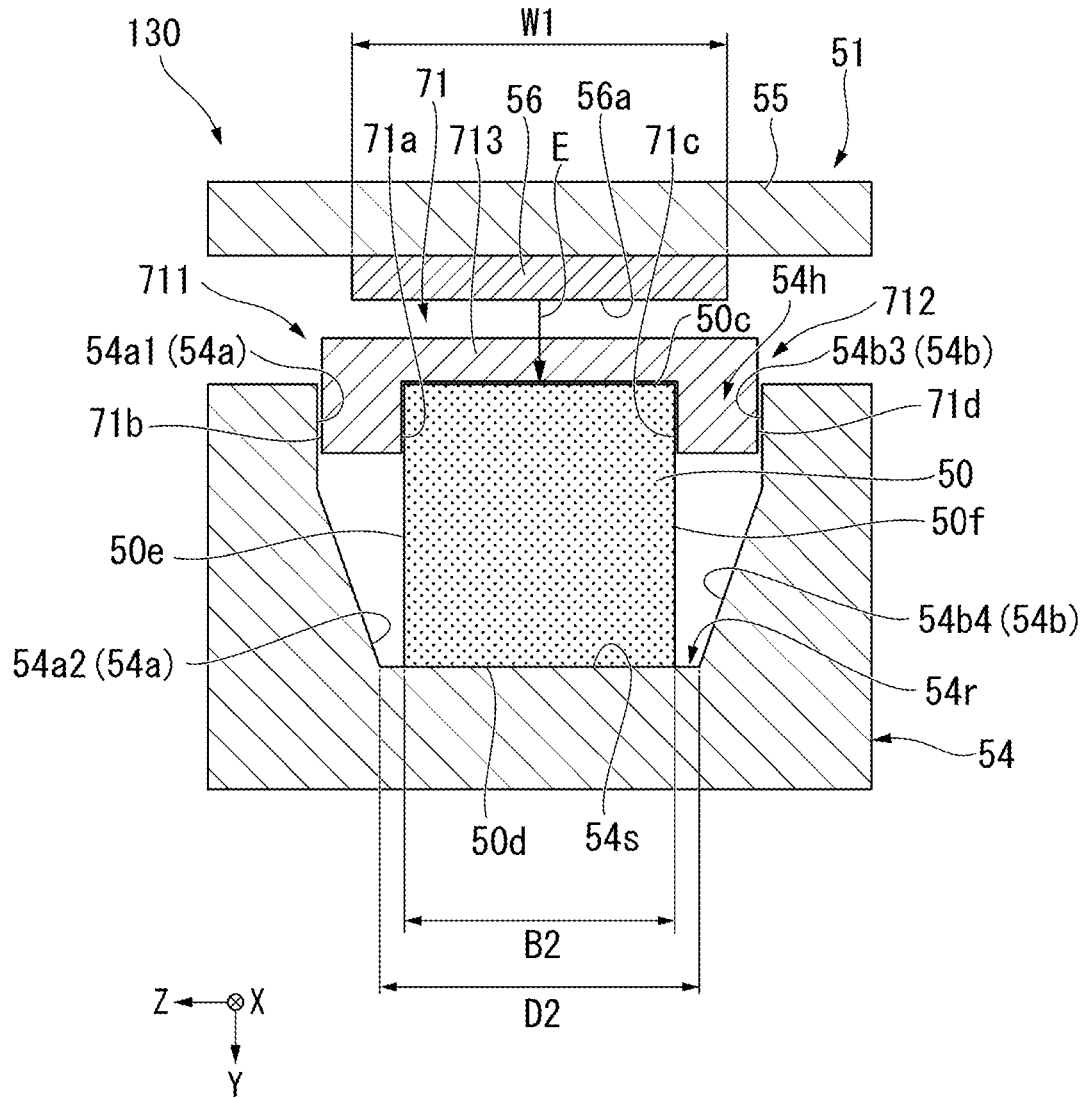
FIG. 10 is a cross-sectional view of the light source apparatus according to a second embodiment.

FIG. 10 is a cross-sectional view of a light source apparatus 130 according to the second embodiment. FIG. 11 is a perspective view of each position restriction member 71. FIG. 12 shows the state before the position restriction members 71 are attached.

In the drawings, components common to those in the drawings used in the first embodiment have the same reference characters and will not be described.

Figure 11:
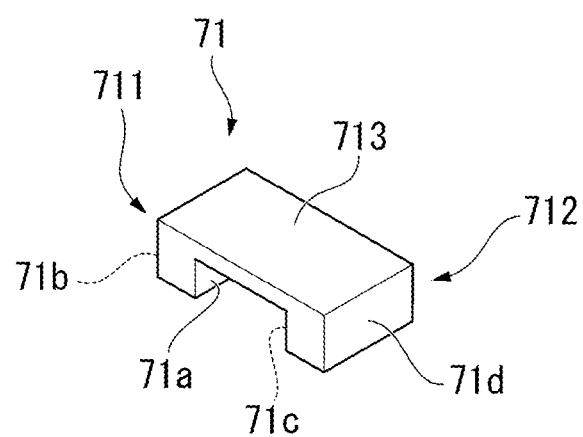
FIG. 11 is a perspective view of the position restriction member.
Figure 12:
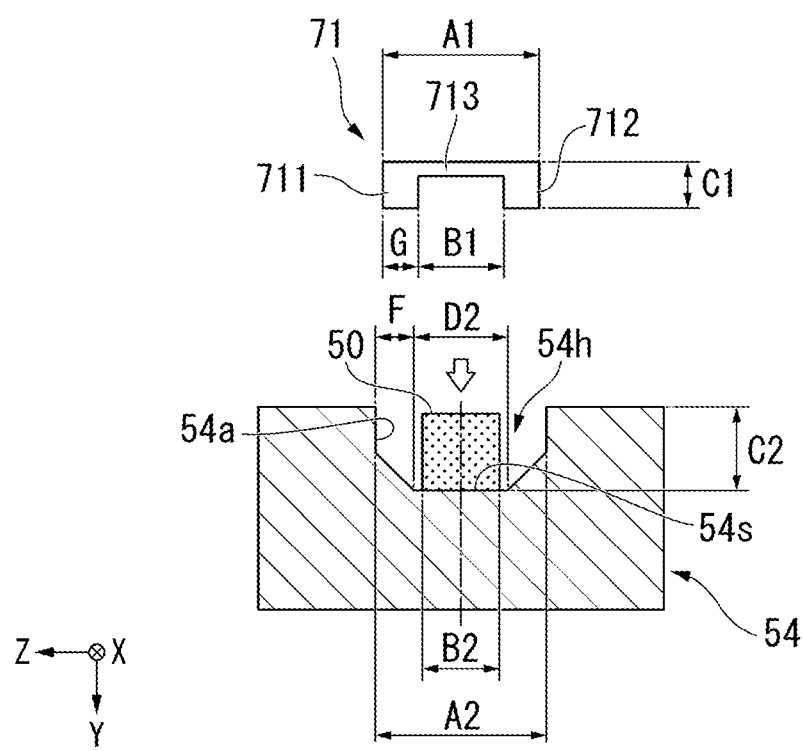
FIG. 12 shows the state before the position restriction member is attached.

In the light source apparatus 130 according to the present embodiment, the position restriction members 71 each include a first placement section 711, which is disposed between the fifth surface 50e and the first wall surface 54a, a second placement section 712, which is disposed between the sixth surface 50f and the second wall surface 54b, and a linkage section 713, which links the first placement section 711 and the second placement section 712 to each other, as shown in FIGS. 10 to 12. The position restriction members 71 are each so shaped that the portion facing the first placement section 711 and the portion facing the second placement section 712 are symmetrical with respect to the center of the linkage section 713. The first placement section 711 and the second placement section 712 are provided with wall portions at the opposite sides of the plate-shaped linkage section 713. The position restriction members 71 each use the first placement section 711 and the second placement section 712 to restrict movement of the wavelength conversion member 50 in the axis-Z direction by a distance greater than or equal to a predetermined value.

The first placement section 711 has a first restriction surface 71a, which faces the fifth surface 50e, and a second restriction surface 71b, which faces the first wall surface 54a. The second placement section 712 has a third restriction surface 71c, which faces the sixth surface 50f, and a fourth restriction surface 71d, which faces the second wall surface 54b. In the present embodiment, the first restriction surface 71a and the fifth surface 50e are separate from each other, and the second restriction surface 71b and the first wall surface 54a are separate from each other. The third restriction surface 71c and the sixth surface 50f are separate from each other, and the fourth restriction surface 71d and the second wall surface 54b are separate from each other.

In the present embodiment, the position restriction members 71 are each formed of a rigid element. The position restriction members 71 are each formed, for example, of a block made of a metallic material, for example, A5052 or any other aluminum material. The first placement section 711, the second placement section 712, and the linkage section 713 are configured as an integrated member in the present embodiment, and may instead have a configuration in which separate members are linked to each other.

Let A1 be the width (length in axis-Z direction) of each of the position restriction members 71, B1 be the spacing (length in axis-Z direction) between the first placement section 711 and the second placement section 712, and C1 be the height of each of the position restriction members 71 (length in axis-Y direction from lower ends of first placement section 711 and second placement section 712 to upper end of linkage section 713), as shown in FIG. 12. Let A2 be the width (length in axis-Z direction) of the groove 54h of the support member 54, B2 be the width (length in axis-Z direction) of the wavelength conversion member 50, C2 be the depth of the groove 54h (length in axis-Y direction), and D2 be the width of the support surface 54s (length in axis-Z direction).

Under the definitions described above, the dimensions satisfy a relationship A1<A2, B1>B2, and C1<C2. That is, the width A1 of each of the position restriction members 71 is smaller than the width A2 of the groove 54h. The spacing B1 between the first placement section 711 and the second placement section 712 is greater than the width B2 of the wavelength conversion member 50. The height C1 of each of the position restriction members 71 is smaller than the depth C2 of the groove 54h.

In the present embodiment, the dimensions described above are, for example, A1=1.9 mm, B1=1.05 mm, C1=0.5 mm, A2=2.0 mm, B2=1.0 mm, and C2=1.1 mm. Therefore, in the present embodiment, in the state in which the position restriction members 71 are attached to the support member 54, when the wavelength conversion member 50 is disposed at the center of the support member 54, the first restriction surface 71a and the fifth surface 50e are separate from each other, and the second restriction surface 71b and the first wall surface 54a are separate from each other, as shown in FIG. 10. The third restriction surface 71c and the sixth surface 50f are separate from each other, and the fourth restriction surface 71d and the second wall surface 54b are separate from each other.

Therefore, in the present embodiment, it is not the case that the wavelength conversion member 50 cannot move in the axis-Z direction at all, and the wavelength conversion member 50 can move from the center of the support member 54 up to the position where the first restriction surface 71a and the fifth surface 50e are in contact with each other, the second restriction surface 71b and the first wall surface 54a are in contact with each other, the position where the third restriction surface 71c and the sixth surface 50f are in contact with each other, or the fourth restriction surface 71d and the second wall surface 54b are in contact with each other. In the example of the dimensions described above, the wavelength conversion member 50 is movable from the center of the support member 54 within a range of (2.0−1.9)/2+(1.05−1.0)/2=0.075 mm in one of the directions +Z and −Z, but movement beyond a distance longer than 0.075 mm is restricted. The movable distance is set within a range that does not cause any problem to an optical system downstream from the light source apparatus 130.

In the first embodiment, the problem with the case where no position restriction member is provided, that is, the situation in which a corner of the wavelength conversion member is stranded on one of the wall surfaces of the groove has been described. In the present embodiment, the wavelength conversion member 50 can slightly move in the axis-Z direction. In this case, a dimensional condition that does not allow a corner of the wavelength conversion member 50 to be stranded on the first wall surface 54a or the second wall surface 54b of the groove 54h will be examined below.

Let G be the width (length in axis-Z direction) of the first placement section 711 of each of the position restriction members 71, and F be the width (length in axis-Z direction) of the first wall surface 54a of the support member 54, as shown in FIG. 12. The wavelength conversion member 50 is not stranded on the first wall surface 54a as long as the width G of the first placement section 711 is greater than or equal to the width F of the first wall surface 54a even when the wavelength conversion member moves in the direction +Z by the maximum distance. The condition under which the wavelength conversion member 50 is not stranded on the first wall surface 54a is therefore G≥F. Since G=(A1−B1)/2 and F=(A2−D2)/2, the conditional expression described above is rewritten to derive the condition that causes the wavelength conversion member 50 not to be stranded on the first wall surface 54a, (A1−B1)/2≥(A2−D2)/2. The same holds true for the second wall surface 54b.

Although not shown, also in the present embodiment, when viewed in the direction perpendicular to the third surface 50c of the wavelength conversion member 50 (axis-Y direction), the position restriction members 71 are disposed at positions where the position restriction members 65 do not overlap with the light emitter 56, as in the first embodiment. It is desirable that the position restriction members 71 be disposed at positions where the position restriction members 71 do not overlap with the light emitter 56, and located at longitudinally opposite ends of the wavelength conversion member 50, that is, at two locations that are the end, of the wavelength conversion member 50, that is close to the first surface 50a and the end, of the wavelength conversion member 50, that is close to the second surface 50b. The arrangement described above prevents the position restriction members 71 from blocking the excitation light E outputted from the light emitter 56. Furthermore, even when the wavelength conversion member 50 disposed on the support member 54 is stranded on the first wall surface 54a or the second wall surface 54b, attaching the position restriction members 71 can solve the problem of the wavelength conversion member 50 stranded on the wall surface. The other configurations of the light source apparatus 130 are the same as those in the first embodiment.

Effects of Second Embodiment

The light source apparatus 130 according to the present variation, which also increases the efficiency of utilization of the excitation light E and ensures desired wavelength conversion efficiency, provides the same effects as those provided by the first embodiment described above, for example, fluorescence Y having desired intensity can be generated, and desired fluorescence Y is allowed to enter an optical system downstream from the light source apparatus 130.

In the light source apparatus 130 according to the present embodiment, the first placement section 711 and the second placement section 712 of each of the position restriction members 71 are each formed of a rigid element. The first restriction surface 71a and the fifth surface 50e are separate from each other, and the second restriction surface 71b and the first wall surface 54a are separate from each other. The third restriction surface 71c and the sixth surface 50f are separate from each other, and the fourth restriction surface 71d and the second wall surface 54b are separate from each other.

According to the configuration described above, it is not the case that the wavelength conversion member 50 cannot move in the axis-Z direction at all, and the effects that should be provided can be provided by appropriately setting the aforementioned movable distance of the wavelength conversion member 50. Furthermore, dimensional allowances in production of each member and in assembly of the light source apparatus 130 are created, whereby the light source apparatus 130 is readily manufactured.

First Variation

Variations of the present embodiment will be described below.

Figure 13:
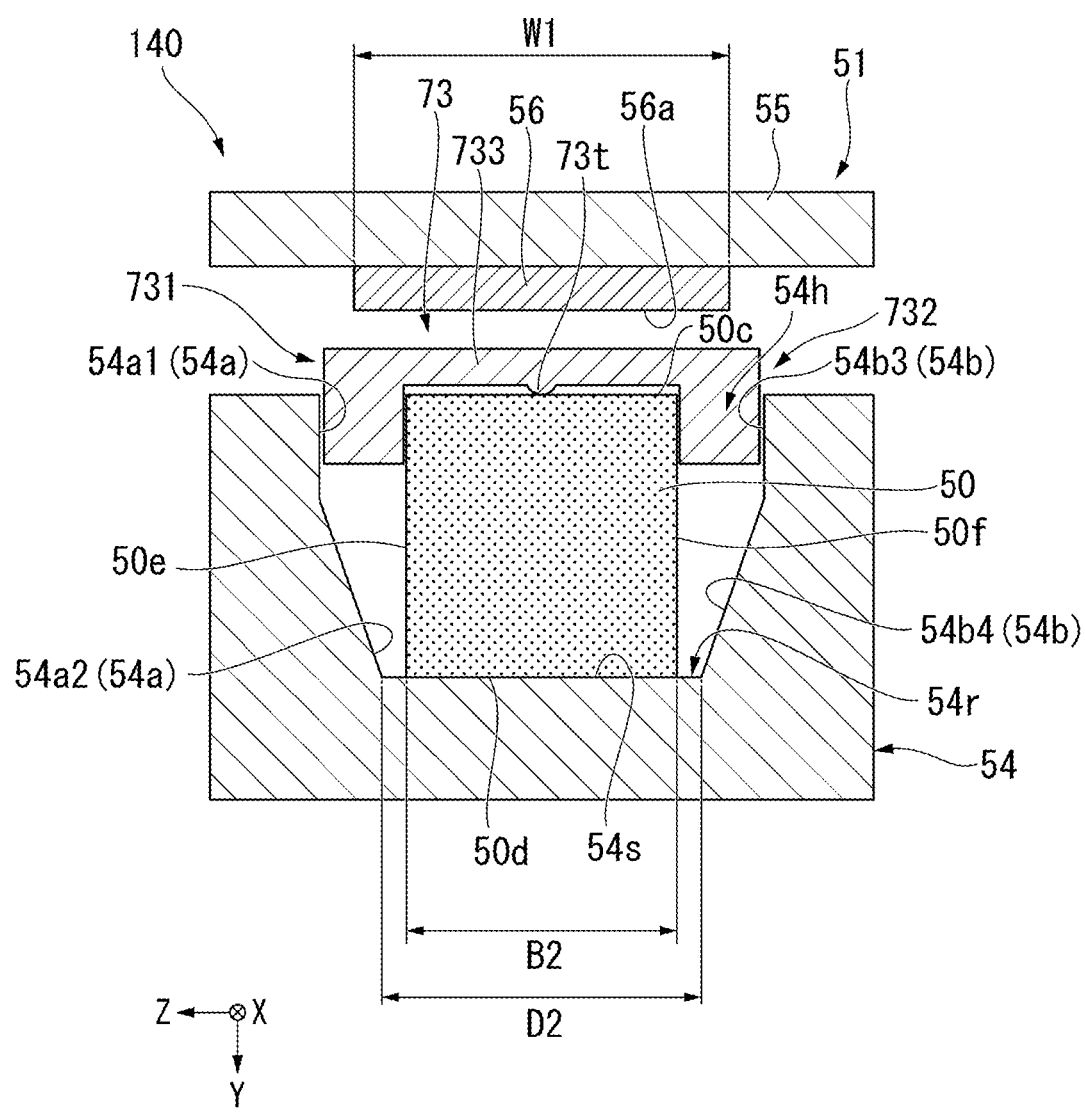
FIG. 13 is a cross-sectional view of the light source apparatus according to a first variation.

FIG. 13 is a cross-sectional view of a light source apparatus 140 according to a first variation. In the following drawings, components common to those of the light source apparatus 130 according to the embodiment described above have the same reference characters and will not be described.

The light source apparatus 140 according to the first variation includes the wavelength conversion member 50, the support member 54, position restriction members 73, and the light source section 51, as shown in FIG. 13. The position restriction members 73 each include a first placement section 731, a second placement section 732, and a linkage section 733. The linkage section 733 has a protrusion 73t, which protrudes toward the third surface 50c of the wavelength conversion member 50 and is in contact with the third surface 50c. The protrusion 73t only needs to be in contact with the third surface 50c in a stable manner, and the shape of the protrusion 73t and the number thereof are not specifically limited to a specific shape and number.

The light source apparatus 140 according to the present variation, which also increases the efficiency of utilization of the excitation light E and ensures desired wavelength conversion efficiency, provides the same effects as those provided by the embodiments described above, for example, fluorescence Y having desired intensity can be generated, and desired fluorescence Y is allowed to enter an optical system downstream from the light source apparatus 140.

In the light source apparatus 140 according to the present variation, in which the linkage section 733 has the protrusion 73t, which protrudes toward the third surface 50c of the wavelength conversion member 50 and is in contact with the third surface 50c, the wavelength conversion member 50 is pressed against the support surface 54s. The heat of the wavelength conversion member 50 is therefore more reliably transferred to the support member 54, whereby desired wavelength conversion efficiency can be maintained.

Second Variation

Figure 14:
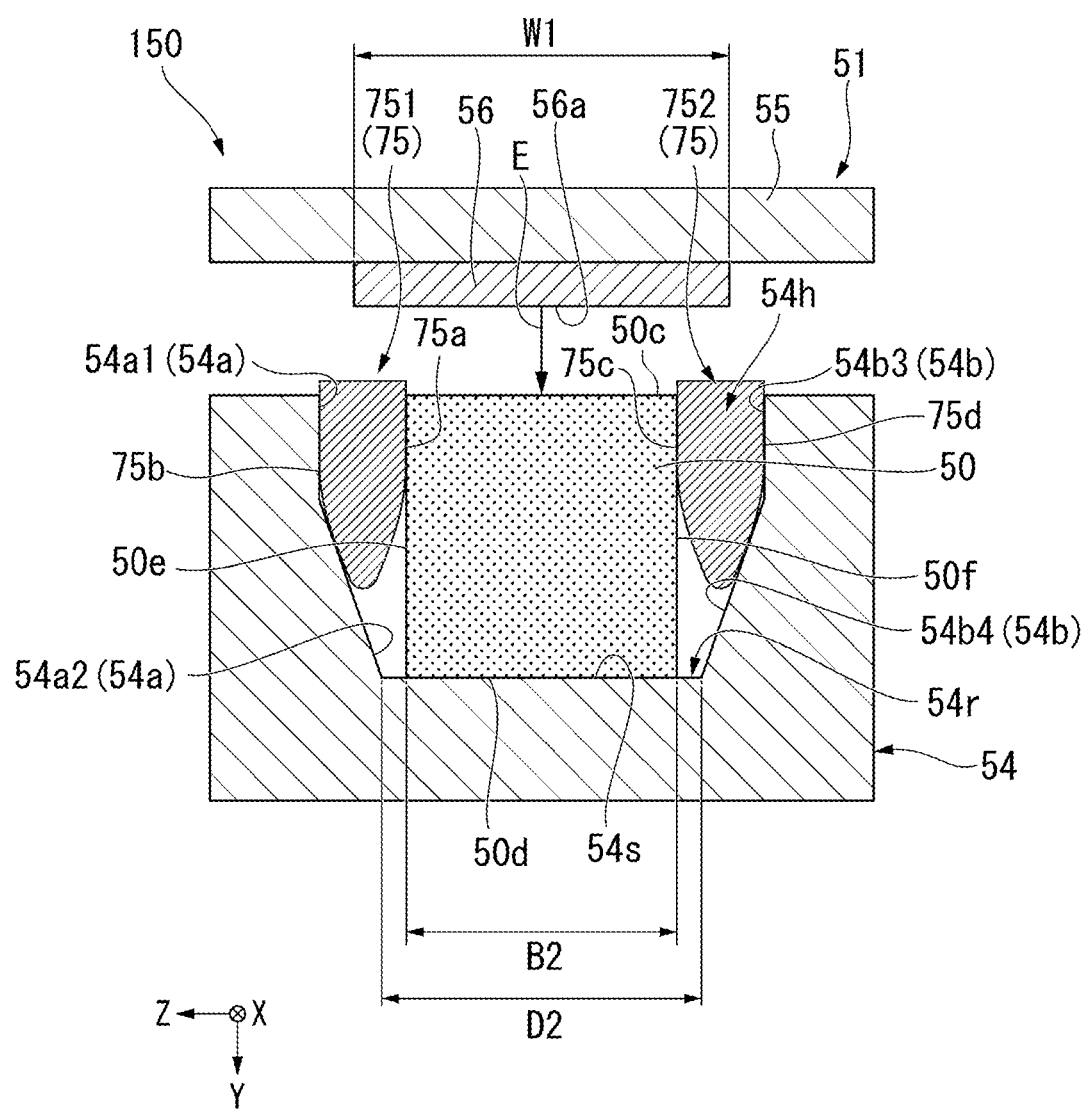
FIG. 14 is a cross-sectional view of the light source apparatus according to a second variation.

FIG. 14 is a cross-sectional view of a light source apparatus 150 according to a second variation.

The light source apparatus 150 according to the second variation includes the wavelength conversion member 50, the support member 54, position restriction members 75, and the light source section 51, as shown in FIG. 14. The position restriction members 75 each include a first placement section 751 and a second placement section 752. The first placement section 751 and the second placement section 752 are formed of separate members. The first placement section 751 and the second placement section 752 have the same shape and the same dimensions. In the present variation, each of the first placement section 751 and the second placement section 752 has a wedge-like shape having a tapering end portion, but does not need to have a specific shape.

The first placement section 751 has a first restriction surface 75a, which is in contact with the fifth surface 50e, and a second restriction surface 75b, which is in contact with the first wall surface 54a. The second placement section 752 has a third restriction surface 75c, which is in contact with the sixth surface 50f, and a fourth restriction surface 75d, which is in contact with the second wall surface 54b. The first restriction surface 75a and the fifth surface 50e, the second restriction surface 75b and the first wall surface 54a, the third restriction surface 75c and the sixth surface 50f, the fourth restriction surface 75d and the second wall surface 54b may be separate from each other.

The light source apparatus 150 according to the present variation, which also increases the efficiency of utilization of the excitation light E and ensures desired wavelength conversion efficiency, provides the same effects as those provided by the embodiments described above, for example, fluorescence Y having desired intensity can be generated, and desired fluorescence Y is allowed to enter an optical system downstream from the light source apparatus 150.

In the light source apparatus 150 according to the present variation, the first placement section 751 and the second placement section 752 are formed of separate members and include no linkage section, so that it is not necessary to employ an arrangement in which the position restriction members 75 do not overlap with the light emitter 56, whereby the position restriction members 75 can be disposed with increased flexibility.

Third Embodiment

A third embodiment of the present disclosure will be described below with reference to FIGS. 15 and 16.

The basic configurations of a projector and a light source apparatus according to the third embodiment are the same as those in the first embodiment, but the configuration of the position restriction members differs from that in the first embodiment. The basic configurations of the projector and the light source apparatus will therefore not be described.

Figure 15:
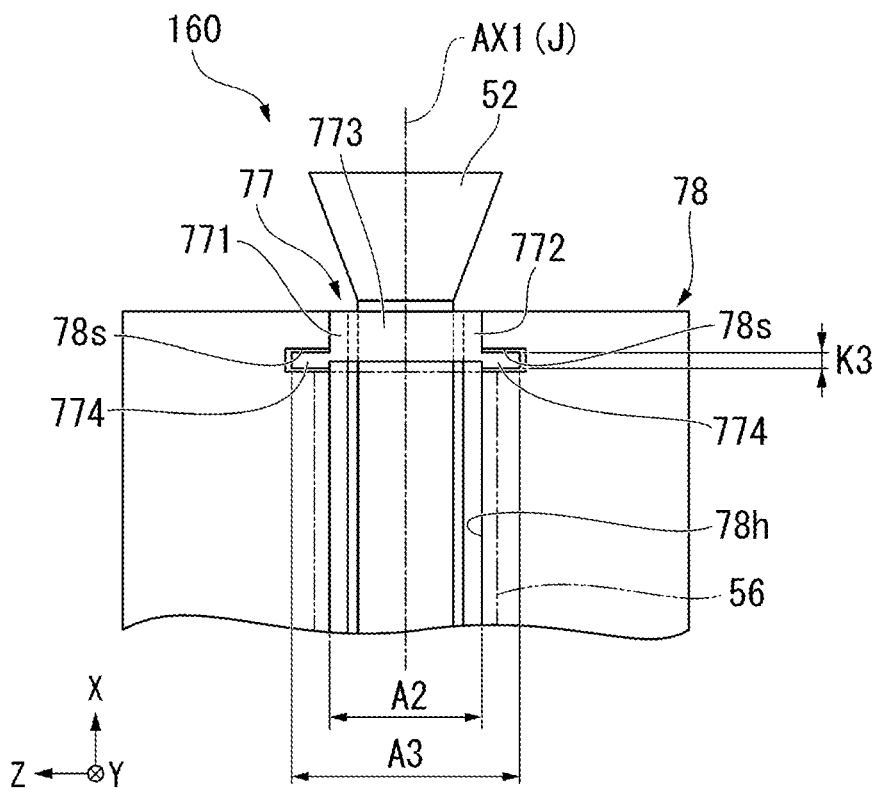
FIG. 15 is a plan view of the light source apparatus according to a third embodiment viewed in the axis-Y direction.

FIG. 15 is a plan view of a light source apparatus 160 according to the third embodiment. FIG. 16 is a perspective view of each position restriction member 77.

In FIG. 15, components common to those in the figures used in the first embodiment have the same reference characters and will not be described.

Figure 16:
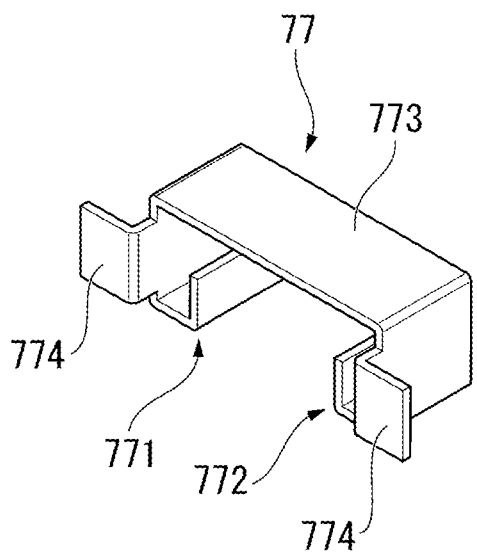
FIG. 16 is a perspective view of the position restriction member.

The position restriction members 77 in the present embodiment each include a first placement section 771, a second placement section 772, a linkage section 773, and third placement sections 774, as shown in FIG. 16. In the present embodiment, no cross-sectional view of the light source apparatus 160 is presented, but the first placement section 771 is disposed between the fifth surface 50e and the first wall surface 54a, as in the first embodiment. The second placement section 772 is disposed between the sixth surface 50f and the second wall surface 54b. The first placement section 771, the second placement section 772, the linkage section 773, and the third placement sections 774 are configured as an integrated member. The position restriction members 77 are each produced by bending a plate made, for example, of a metallic material. The plate may be made of an elastically deformable or non-elastically deformable material.

The third placement sections 774 each have a shape that overhangs in the form of a planar plate outward in the axis-Z direction off the first placement section 771 or the second placement section 772, as shown in FIG. 15. The third placement sections 774 are therefore provided so as to parallel to the plane YZ. On the other hand, a portion of a groove 78h of a support member 78 is provided with two narrow grooves 78s. The two narrow grooves 78s extend outward in the axis-Z direction from the wall surfaces of the groove 78h that face the side X. In the state in which the position restriction members 77 are attached to the support member 78, the third placement sections 774 are inserted into the narrow grooves 78s. The other configurations of the light source apparatus 160 are the same as those in the first embodiment.

The dimensions of each of the position restriction members 77 are, for example, a width (length in axis-Z direction) A3 of each of the position restriction members 77 is 2.5 mm, and a plate thickness K3 of each of the third placement sections 774 is 0.2 mm. In this case, when the width A2 of the groove 78h of the support member 78 is 2.0 mm, the third arrangement sections 774 overhang by about 0.25 mm outward beyond the groove 78h.

Effects of Third Embodiment

The light source apparatus 160 according to the present embodiment, which also increases the efficiency of utilization of the excitation light E and ensures desired wavelength conversion efficiency, provides the same effects as those provided by the first embodiment described above, for example, fluorescence Y having desired intensity can be generated, and desired fluorescence Y is allowed to enter an optical system downstream from the light source apparatus 160.

In the first embodiment, when the position restriction members 65 are attached to the support member 54 in the assembly of the light source apparatus 100, the position restriction members 65 only need to be pushed into the groove 54h, whereby the attachment can be readily performed. In the configuration described above, however, the positions of the position restriction members 65 may shift in the direction in which the groove 54h extends (axis-X direction), and the position restriction members 65 may fall off the support member 54 in some cases. In view of the problem described above, the light source apparatus 160 according to the present embodiment, in which the position restriction members 77 each include the third placement sections 774 and the third placement sections 774 are inserted into the narrow grooves 78s of the support member 78, restricts movement of the position restriction members 77 in the axis-X direction. As a result, a risk of shift of the position restriction members 77 in the direction in which the groove 78h of the support member 78 extends is reduced, whereby the risk of the fall of the position restriction members 77 off the support member 78 can be reduced.

First Variation

Variations of the present embodiment will be described below.

Figure 17:
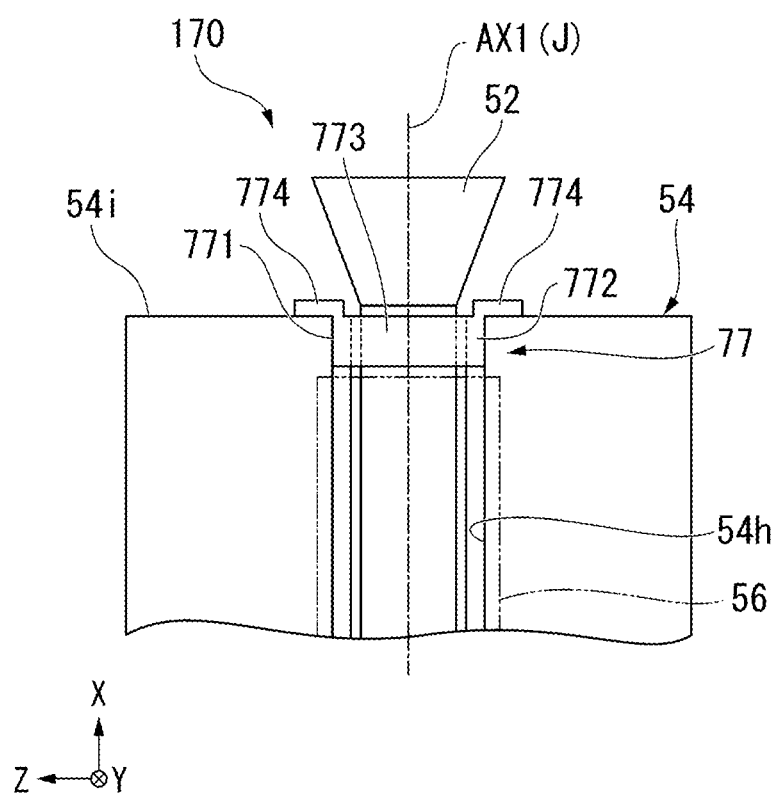
FIG. 17 is a plan view of the light source apparatus according to a first variation.

FIG. 17 is a plan view of a light source apparatus 170 according to a first variation. In FIG. 17, components common to those of the light source apparatus 160 according to the embodiment described above have the same reference characters and will not be described.

The light source apparatus 170 according to the first variation includes the same position restriction members 77 in the light source apparatus 160 according to the embodiment described above, as shown in FIG. 17. That is, the position regulation members 77 each include the third placement sections 774, which overhang outward in the axis-Z direction off the first placement section 771 and the second placement section 772. On the other hand, the support member 54 is provided with no narrow groove in the present variation, unlike in the embodiment described above. The third placement sections 774 are in contact with an end surface 54i of the support member 54.

According to the configuration of the present variation, in which the third placement sections 774 are in contact with the end surface 54i of the support member 54, the movement of the position restriction members 77 in the direction −X is restricted, while the movement of the position restriction members 77 in the direction +X is not restricted. Therefore, in the present variation, a fitting portion or any other component that restricts the movement of the position restriction members 77 in the direction +X may be provided at the end surface 54i of the support member 54.

The technical scope of the present disclosure is not limited to the embodiments described above, and a variety of changes can be made thereto to the extent that the changes do not depart from the intent of the present disclosure. An aspect of the present disclosure can be an appropriate combination of the characteristic portions in the embodiments described above.

The light source apparatuses according to the aforementioned embodiments have been described with reference to the case where the position restriction members are made of a metallic material that excels in light and heat resistance. The position restriction members may instead be made, for example, of a light transmissive material that satisfies the light and heat resistance requirements. In this case, since the position restriction members do not block the excitation light, the position restriction members may be disposed at positions where the position restriction members overlap with the light emitter when viewed in the direction perpendicular to the third surface of the wavelength conversion member.

In the embodiments described above, the wall surfaces of the groove of the support member each have a portion perpendicular to the support surface and a portion inclining with respect to the support surface, but the groove does not necessarily have a specific shape. For example, all regions of each of the wall surfaces of the groove may instead be perpendicular to the support surface. Still instead, the wall surfaces of the groove may be curved.

The aforementioned embodiments have been described with reference to the case where the present disclosure is applied to a light source apparatus including a wavelength conversion member. In place of the configuration described above, the present disclosure may be applied to a light source apparatus in which the incident light propagates without being involved in wavelength conversion and then exits, for example, with the angular distribution controlled. In this case, the wavelength conversion member in the embodiments described above functions as a light guide member, and the light outputted from the light emitter exits out of the angle conversion member as light having the same wavelength band.

In addition, the specific descriptions of the shape, the number, the arrangement, the materials, and other factors of the components of the light source apparatus and the projector are not limited to those in the embodiments described above and can be changed as appropriate. The aforementioned embodiments have been described with reference to the case where the light source apparatus according to the present disclosure is incorporated in a projector using liquid crystal panels, but not necessarily. The light source apparatus according to the present disclosure may be incorporated in a projector using a digital micromirror device as each of the light modulators. The projector may not include a plurality of light modulators and may instead include only one light modulator.

The aforementioned embodiments have been described with reference to the case where the light source apparatus according to the present disclosure is incorporated in a projector, but not necessarily. The light source apparatus according to the present disclosure may be used as a lighting apparatus, a headlight of an automobile, and other components.

A light source apparatus according to an aspect of the present disclosure may have the configuration below.

The light source apparatus according to the aspect of the present disclosure includes a light emitter that outputs light, a light guide member that guides the light outputted from the light emitter, a support member that has a groove and supports the light guide member in the groove, and a position restriction member that restricts the position of the light guide member in the groove. The light guide member has a first surface and a second surface located at sides opposite from each other in a first direction that is the longitudinal direction of the light guide member, a third surface and a fourth surface located at sides opposite from each other in a second direction in an imaginary plane perpendicular to the first direction, and a fifth surface and a sixth surface located at sides opposite from each other in a third direction perpendicular to the second direction in the imaginary plane. The light guided through the light guide member exits via the first surface. The light emitter is provided so as to face the third surface. The groove has a support surface facing the fourth surface, a first wall surface facing the fifth surface and separate from the fifth surface, and a second wall surface facing the sixth surface and separate from the sixth surface. The position restriction member includes a first placement section disposed in the groove between the fifth surface and the first wall surface, and a second placement section disposed in the groove between the sixth surface and the second wall surface.

In the light source apparatus according to the aspect of the present disclosure, the first placement section may have a first restriction surface that faces the fifth surface, and a second restriction surface that faces the first wall surface, and the second placement section may have a third restriction surface that faces the sixth surface, and a fourth restriction surface that faces the second wall surface.

In the light source apparatus according to the aspect of the present disclosure, the first restriction surface and the fifth surface may be in contact with each other, the second restriction surface and the first wall surface may be in contact with each other, the third restriction surface and the sixth surface may be in contact with each other, and the fourth restriction surface and the second wall surface may be in contact with each other.

In the light source apparatus according to the aspect of the present disclosure, the first and second placement sections may each be made of an elastically deformable material. The elastically deformed first placement section may be disposed in the groove between the fifth surface and the first wall surface, and the elastically deformed second placement section may be disposed in the groove between the sixth surface and the second wall surface.

In the light source apparatus according to the aspect of the present disclosure, the first restriction surface and the fifth surface may be separate from each other, the second restriction surface and the first wall surface may be separate from each other, the third restriction surface and the sixth surface may be separate from each other, and the fourth restriction surface and the second wall surface may be separate from each other.

In the light source apparatus according to the aspect of the present disclosure, the first and second placement sections may each be formed of a rigid element.

In the light source apparatus according to the aspect of the present disclosure, the position restriction member may further include a linkage section that is provided so as to face the third surface and links the first and second placement sections to each other.

In the light source apparatus according to the aspect of the present disclosure, when viewed in the direction perpendicular to the third surface, the position restriction member may be disposed at a position where the position restriction member does not overlap with the light emitter.

In the light source apparatus according to the aspect of the present disclosure, the linkage section may have a protrusion protruding toward the third surface and in contact with the third surface.

In the light source apparatus according to the aspect of the present disclosure, the first and second placement sections may be formed of separate members.

In the light source apparatus according to the aspect of the present disclosure, the position restriction member may further include a third placement section, and the third placement section may be fitted to the support member and restrict movement of the position restriction member in the first direction.

In the light source apparatus according to the aspect of the present disclosure, the first wall surface may have a first section located at the side close to the third surface, and a second section located at the side close to the support surface. The first section may extend in the direction perpendicular to the support surface. The second section may incline so as to approach the fifth surface as extending from the side close to the first section toward the support surface. The second wall surface may have a third section located at the side close to the third surface, and a fourth section located at the side close to the support surface. The third section may extend in the direction perpendicular to the support surface. The fourth section may incline so as to approach the sixth surface as extending from the side close to the third section toward the support surface. The first, second, third, and fourth sections may reflect at least part of the light.

In the light source apparatus according to the aspect of the present disclosure, the light emitter may output first light having a first wavelength band, and the light guide member may be a wavelength conversion member that contains a phosphor, converts the first light outputted from the light emitter into second light having a second wavelength band different from the first wavelength band, and outputs the second light.

A projector according to another aspect of the present disclosure may have the configuration below.

The projector according to the other aspect of the present disclosure includes the light source apparatus according to the aspect of the present disclosure, a light modulator that modulates the light outputted from the light source apparatus and containing the second light in accordance with image information, and a projection optical apparatus that projects the light modulated by the light modulator.

What is claimed is:
1. A light source apparatus comprising:
a light emitter that outputs light;
a light guide member that guides the light outputted from the light emitter;
a support member that has a groove and supports the light guide member in the groove; and a position restriction member that restricts a position of the light guide member in the groove, wherein the light guide member has a first surface and a second surface located at sides opposite from each other in a first direction that is a longitudinal direction of the light guide member, a third surface and a fourth surface located at sides opposite from each other in a second direction in an imaginary plane perpendicular to the first direction, and a fifth surface and a sixth surface located at sides opposite from each other in a third direction perpendicular to the second direction in the imaginary plane, the light guided through the light guide member exits via the first surface, the light emitter is provided so as to face the third surface, the groove has a support surface facing the fourth surface, a first wall surface facing the fifth surface and separate from the fifth surface, and a second wall surface facing the sixth surface and separate from the sixth surface, and the position restriction member includes a first placement section disposed in the groove between the fifth surface and the first wall surface, and a second placement section disposed in the groove between the sixth surface and the second wall surface.

2. The light source apparatus according to claim 1,
wherein the first placement section has a first restriction surface that faces the fifth surface, and a second restriction surface that faces the first wall surface, and the second placement section has a third restriction surface that faces the sixth surface, and a fourth restriction surface that faces the second wall surface.

3. The light source apparatus according to claim 2, wherein the first restriction surface and the fifth surface are in contact with each other, the second restriction surface and the first wall surface are in contact with each other, the third restriction surface and the sixth surface are in contact with each other, and the fourth restriction surface and the second wall surface are in contact with each other.

4. The light source apparatus according to claim 3,
wherein the first and second placement sections are each made of an elastically deformable material, the elastically deformed first placement section is disposed in the groove between the fifth surface and the first wall surface, and the elastically deformed second placement section is disposed in the groove between the sixth surface and the second wall surface.

5. The light source apparatus according to claim 2, wherein the first restriction surface and the fifth surface are separate from each other, the second restriction surface and the first wall surface are separate from each other, the third restriction surface and the sixth surface are separate from each other, and the fourth restriction surface and the second wall surface are separate from each other.

6. The light source apparatus according to claim 5, wherein the first and second placement sections are each formed of a rigid element.

7. The light source apparatus according to claim 1, wherein the position restriction member further includes a linkage section that is provided so as to face the third surface and links the first and second placement sections to each other.

8. The light source apparatus according to claim 7, wherein when viewed in a direction perpendicular to the third surface, the position restriction member is disposed at a position where the position restriction member does not overlap with the light emitter.

9. The light source apparatus according to claim 7, wherein the linkage section has a protrusion protruding toward the third surface and in contact with the third surface.

10. The light source apparatus according to claim 1, wherein the first and second placement sections are formed of separate members.

11. The light source apparatus according to claim 1,
wherein the position restriction member further includes a third placement section, and the third placement section is fitted to the support member and restricts movement of the position restriction member in the first direction.

12. The light source apparatus according to claim 1,
wherein the first wall surface has a first section located at a side close to the third surface, and a second section located at a side close to the support surface, the first section extending in a direction perpendicular to the support surface, the second section inclining so as to approach the fifth surface as extending from a side close to the first section toward the support surface, the second wall surface has a third section located at the side close to the third surface, and a fourth section located at the side close to the support surface, the third section extending in the direction perpendicular to the support surface, the fourth section inclining so as to approach the sixth surface as extending from a side close to the third section toward the support surface, and the first, second, third, and fourth sections reflect at least part of the light.

13. The light source apparatus according to claim 1,
wherein the light emitter outputs first light having a first wavelength band, and the light guide member is a wavelength conversion member that contains a phosphor, converts the first light outputted from the light emitter into second light having a second wavelength band different from the first wavelength band, and outputs the second light.

14. A projector comprising:
the light source apparatus according to claim 1;
a light modulator that modulates the light outputted from the light source apparatus and containing the second light in accordance with image information; and
a projection optical apparatus that projects the light modulated by the light modulator.

* * * * *